United States Patent
Lin

(10) Patent No.: US 11,160,057 B2
(45) Date of Patent: Oct. 26, 2021

(54) METHOD AND APPARATUS FOR IMPROVING PRECODING RESOURCE BLOCK GROUP IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/952,894

(22) Filed: Apr. 13, 2018

(65) Prior Publication Data
US 2018/0310300 A1 Oct. 25, 2018

Related U.S. Application Data

(60) Provisional application No. 62/488,226, filed on Apr. 21, 2017.

(51) Int. Cl.
| | |
|---|---|
| *H04W 72/04* | (2009.01) |
| *H04L 5/00* | (2006.01) |
| *H04B 7/0456* | (2017.01) |

(52) U.S. Cl.
CPC ...... *H04W 72/0413* (2013.01); *H04B 7/0456* (2013.01); *H04L 5/0051* (2013.01);
(Continued)

(58) Field of Classification Search
CPC .... H04W 72/0413; H04B 7/0456; H03L 5/00; H03L 5/0051; H03L 5/0053;
(Continued)

(56) References Cited

U.S. PATENT DOCUMENTS

| | | | | |
|---|---|---|---|---|
| 2014/0321399 A1* | 10/2014 | Liu | ................. | H04W 72/042 370/329 |
| 2015/0078271 A1 | 3/2015 | Kim | | |

(Continued)

FOREIGN PATENT DOCUMENTS

| | | |
|---|---|---|
| CN | 102740238 A | 10/2012 |
| CN | 103974427 | 8/2014 |

(Continued)

OTHER PUBLICATIONS

Ericsson: "Downlink Precoding Granularity and Configuration", 3GPP Draft; R1-1705889, 3rd Generation Partnership Project (36PP), Mobile Competence Centre ; 650, Route Des Lucioles ; F-06921 Sophia-Antipolis Cedex ;France, vol. RAN WG1, No. Spokane, WA, USA; Apr. 3, 2017-Apr. 7, 2017 Apr. 2, 2017 (Apr. 2, 2017), XP051244O00, Retrieved from the Internet: URL:http://www.3gpp.org/ftp/Meetings_3GPP_SYNC/RAN1/Docs.

ZTE, ZTE Microelectronics, on PRB Bunding, 3GPP TSG RAN WG1 Meeting #88bis, Spokane, USA, Apr. 3-7, 2017, R1-1704396. 3rd Generation Partnership Project; Technical Specification Group Radio Access Network; Evolved Universal Terrestrial Radio Access (E-UTRA); Physical layer procedures (Release 14), 3GPP TS 36.213, 3GPP, Mar. 2017, V14.2.0, pp. 75-79.

(Continued)

*Primary Examiner* — Jeffrey M Rutkowski
*Assistant Examiner* — Jasper Kwoh
(74) *Attorney, Agent, or Firm* — Skaar Ulbrich Macari, P.A.

(57) ABSTRACT

A method and apparatus are disclosed from the perspective of a UE. In one embodiment, the method includes the UE receiving a configuration of functionality of PRB bundling from a base station. The method also includes the UE receiving an indication from the base station regarding whether the functionality of PRB bundling is applied to a TTI or not.

10 Claims, 35 Drawing Sheets

(52) U.S. Cl.
CPC .......... *H04L 5/0053* (2013.01); *H04L 5/0091* (2013.01); *H04L 5/001* (2013.01); *H04L 5/0007* (2013.01); *H04L 5/0041* (2013.01); *H04L 5/0094* (2013.01)

(58) Field of Classification Search
CPC ..... H03L 5/0091; H03L 5/0007; H03L 5/001; H03L 5/0041; H03L 5/0094
See application file for complete search history.

(56) References Cited

U.S. PATENT DOCUMENTS

| | | | |
|---|---|---|---|
| 2016/0014728 A1 | 1/2016 | Seo | |
| 2016/0021642 A1* | 1/2016 | Kim | H04L 5/0039 370/329 |
| 2016/0050000 A1* | 2/2016 | Zhang | H04B 7/0417 375/267 |
| 2016/0227520 A1 | 8/2016 | Davydov et al. | |
| 2016/0373229 A1 | 12/2016 | You | |
| 2018/0227101 A1* | 8/2018 | Park | H04L 27/2613 |
| 2018/0235025 A1* | 8/2018 | Chen | H04L 5/0064 |
| 2019/0159182 A1* | 5/2019 | Ranta-aho | H04W 72/042 |
| 2019/0190572 A1* | 6/2019 | Osawa | H04B 7/0404 |
| 2020/0136679 A1* | 4/2020 | Shen | H04W 72/0446 |

FOREIGN PATENT DOCUMENTS

| | | |
|---|---|---|
| CN | 102316581 B | 12/2014 |
| WO | 2014117712 A1 | 8/2014 |

OTHER PUBLICATIONS

Office Action from Japan Patent Office in corresponding JP Application No. 2018-077253, dated Mar. 19, 2019.
European Search Report in corresponding EP Application No. 18167146.2, dated Dec. 12, 2018.
Office Action from Taiwan Patent Office in corresponding TW Application No. 107112832, dated Feb. 26, 2019.
Nokia et al., R1-1701078, DL transmission mode configuration for NR, 3GPP TSG RAN WG1 #AH, 3GPP Server Publication Date (Jan. 9, 2017) End.
Office Action from Korean Intellectual Property Office in corresponding KR Application No. 10-2018-0043534, dated Feb. 26, 2020.
ZTE et al., R1-1704396, on PRB Bundling, 3GPP TSG RAN WG1 Meeting #88bis, 3GPP Server Publication Date, Mar. 25, 2017, 4 pages.
Office Action to the corresponding Chinese Patent Application rendered by the State Intellectual Property Office of China (SIPO) dated Jul. 3, 2020, 16 pages (including English translation).
Office Action to the corresponding Indian Patent Application rendered by Intellectual Property India dated May 15, 2020, 7 pages.
Office Action to the corresponding Korean Patent Application rendered by the Korean Intellectual Property Office dated Jun. 23, 2020, 8 pages (including English translation).
Office Action to the corresponding EP Patent Application rendered by the European Patent Office (EPO) dated Oct. 2, 2020, 6 pages.

* cited by examiner

| Configuration | | $N_{sc}^{RB}$ | $N_{symb}^{DL}$ |
|---|---|---|---|
| Normal cyclic prefix | $\Delta f = 15$ kHz | 12 | 7 |
| Extended cyclic prefix | $\Delta f = 15$ kHz | | 6 |
| | $\Delta f = 7.5$ kHz | 24 | 3 |

FIG. 6 (PRIOR ART)

| Configuration | | Cyclic prefix length $N_{CP,l}$ |
|---|---|---|
| Normal cyclic prefix | $\Delta f = 15$ kHz | 160 for $l = 0$<br>144 for $l = 1,2,...,6$ |
| Extended cyclic prefix | $\Delta f = 15$ kHz | 512 for $l = 0,1,...,5$ |
| | $\Delta f = 7.5$ kHz | 1024 for $l = 0,1,2$ |

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|
| 0 | 0 | 1 | 34 | 4 | 6 | 68 | 9 | 12 | 136 | 22 | 27 |
| 1 | 1 | 2 | 35 | 5 | 7 | 69 | 10 | 13 | 137 | 23 | 28 |
| 2 | 2 | 3 | 36 | 6 | 8 | 70 | 11 | 14 | 138 | 24 | 29 |
| 3 | 3 | 4 | 37 | 7 | 9 | 71 | 12 | 15 | 139 | 25 | 30 |
| 4 | 4 | 5 | 38 | 8 | 10 | 72 | 13 | 16 | 140 | 0 | 6 |
| 5 | 5 | 6 | 39 | 9 | 11 | 73 | 14 | 17 | 141 | 1 | 7 |
| 6 | 6 | 7 | 40 | 10 | 12 | 74 | 15 | 18 | 142 | 2 | 8 |
| 7 | 7 | 8 | 41 | 11 | 13 | 75 | 16 | 19 | 143 | 3 | 9 |
| 8 | 8 | 9 | 42 | 12 | 14 | 76 | 17 | 20 | 144 | 4 | 10 |
| 9 | 9 | 10 | 43 | 13 | 15 | 77 | 18 | 21 | 145 | 5 | 11 |
| 10 | 10 | 11 | 44 | 14 | 16 | 78 | 19 | 22 | 146 | 6 | 12 |
| 11 | 11 | 12 | 45 | 15 | 17 | 79 | 20 | 23 | 147 | 7 | 13 |
| 12 | 12 | 13 | 46 | 16 | 18 | 80 | 21 | 24 | 148 | 8 | 14 |
| 13 | 13 | 14 | 47 | 17 | 19 | 81 | 22 | 25 | 149 | 9 | 15 |
| 14 | 14 | 15 | 48 | 18 | 20 | 82 | 23 | 26 | 150 | 10 | 16 |
| 15 | 15 | 16 | 49 | 19 | 21 | 83 | 24 | 27 | 151 | 11 | 17 |
| 16 | 16 | 17 | 50 | 20 | 22 | 84 | 25 | 28 | 152 | 12 | 18 |
| 17 | 17 | 18 | 51 | 21 | 23 | 85 | 26 | 29 | 153 | 13 | 19 |
| 18 | 18 | 19 | 52 | 22 | 24 | 86 | 27 | 30 | 154 | 14 | 20 |
| 19 | 19 | 20 | 53 | 23 | 25 | 87 | 0 | 4 | 155 | 15 | 21 |
| 20 | 20 | 21 | 54 | 24 | 26 | 88 | 1 | 5 | 156 | 16 | 22 |
| 21 | 21 | 22 | 55 | 25 | 27 | 89 | 2 | 6 | 157 | 17 | 23 |
| 22 | 22 | 23 | 56 | 26 | 28 | 90 | 3 | 7 | 158 | 18 | 24 |
| 23 | 23 | 24 | 57 | 27 | 29 | 91 | 4 | 8 | 159 | 19 | 25 |
| 24 | 24 | 25 | 58 | 28 | 30 | 92 | 5 | 9 | 160 | 20 | 26 |
| 25 | 25 | 26 | 59 | 0 | 3 | 93 | 6 | 10 | 161 | 21 | 27 |
| 26 | 26 | 27 | 60 | 1 | 4 | 94 | 7 | 11 | 162 | 22 | 28 |
| 27 | 27 | 28 | 61 | 2 | 5 | 95 | 8 | 12 | 163 | 23 | 29 |
| 28 | 28 | 29 | 62 | 3 | 6 | 96 | 9 | 13 | 164 | 24 | 30 |
| 29 | 29 | 30 | 63 | 4 | 7 | 97 | 10 | 14 | 165 | 0 | 7 |
| 30 | 0 | 2 | 64 | 5 | 8 | 98 | 11 | 15 | 166 | 1 | 8 |
| 31 | 1 | 3 | 65 | 6 | 9 | 99 | 12 | 16 | 167 | 2 | 9 |
| 32 | 2 | 4 | 66 | 7 | 10 | 100 | 13 | 17 | - | - | - |
| 33 | 3 | 5 | 67 | 8 | 11 | 101 | 14 | 18 | - | - | - |

| Physical channel | Modulation schemes |
|---|---|
| PBCH | QPSK |

FIG. 11 (PRIOR ART)

| $l$ | Frame offset, slot and symbol number triplets $(i, n'_s, l')$ | |
|---|---|---|
| | Normal cyclic prefix | Extended cyclic prefix |
| 0 | (1,18,3), (1,19,0), (1,19,4), (0,0,4) | (1,18,3), (1,19,0), (1,19,5) |
| 1 | (1,18,4), (1,19,1), (1,19,5), (0,1,4) | (1,18,4), (1,19,1), (0,0,3) |
| 2 | (1,18,5), (1,19,2), (1,19,6), (0,1,5) | (1,18,5), (1,19,2), (0,1,4) |
| 3 | (1,18,6), (1,19,3), (0,0,3), (0,1,6) | (1,19,3), (1,19,4), (0,1,5) |

FIG. 12 (PRIOR ART)

| $l$ | Slot and symbol number pairs $(n'_s, l')$ | |
|---|---|---|
| | Normal cyclic prefix | Extended cyclic prefix |
| 0 | (0,3), (1,4), (10,3), (11,0), (11,4) | (0,3), (10,3), (11,0) |
| 1 | (0,4), (1,5), (10,4), (11,1), (11,5) | (0,4), (10,4), (11,1) |
| 2 | (0,5), (10,5), (11,2) | (0,5), (10,5), (11,2) |
| 3 | (0,6), (10,6), (11,3) | (1,4), (11,3), (11,4) |

FIG. 13 (PRIOR ART)

| System Bandwidth ($N_{RB}^{DL}$) | PRG Size ($P'$) (PRBs) |
|---|---|
| ≤10 | 1 |
| 11 – 26 | 2 |
| 27 – 63 | 3 |
| 64 – 110 | 2 |

FIG. 15

METHOD AND APPARATUS FOR IMPROVING PRECODING RESOURCE BLOCK GROUP IN A WIRELESS COMMUNICATION SYSTEM

CROSS-REFERENCE TO RELATED APPLICATIONS

The present Application claims the benefit of U.S. Provisional Patent Application Ser. No. 62/488,226 filed on Apr. 21, 2017, the entire disclosure of which is incorporated herein in its entirety by reference.

FIELD

This disclosure generally relates to wireless communication networks, and more particularly, to a method and apparatus for improving precoding resource block group in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving a configuration of functionality of physical resource block (PRB) bundling from a base station. The method also includes the UE receiving an indication from the base station regarding whether the functionality of PRB bundling is applied to a transmission time interval (TTI) or not.

BRIEF DESCRIPTION OF THE DRAWINGS

FIG. 6 is a reproduction of Table 6.2.3-1 of 3GPP TS 36.211 V13.1.0.

FIG. 7 is a reproduction of Table 6.12-1 of 3GPP TS 36.211 V13.1.0.

FIG. 10 is a reproduction of Table 6.11.2.1-1 of 3GPP TS 36.211 V13.1.0.

FIG. 11 is a reproduction of Table 6.6.2-1 of 3GPP TS 36.211 V13.1.0.

FIG. 12 is a reproduction of Table 6.6.4-1 of 3GPP TS 36.211 V13.1.0.

FIG. 13 is a reproduction of Table 6.6.4-2 of 3GPP TS 36.211 V13.1.0.

FIG. 15 is a reproduction of Table 7.1.6.5-1 of 3GPP TS 36.213 V13.1.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE", Ericsson, Huawei; TS 36.211 V13.1.0, "E-UTRA Physical channels and modulation (Release 13)"; TS 36.212 v13.1.0, "Evolved Universal Terrestrial Radio Access (E-UTRA); Multiplexing and channel coding (Release 13)"; TS 36.213 v13.1.1, "E-UTRA Physical layer procedures (Release 13)"; TS 36.331 V14.1.0, "E-UTRA Radio Resource Control (Release 14); and R4-1610920, WF on channel bandwidth and transmission bandwidth configuration for NR, NTT DOCOMO. The standards and documents listed above are hereby expressly incorporated by reference in their entirety.

Figure 1:
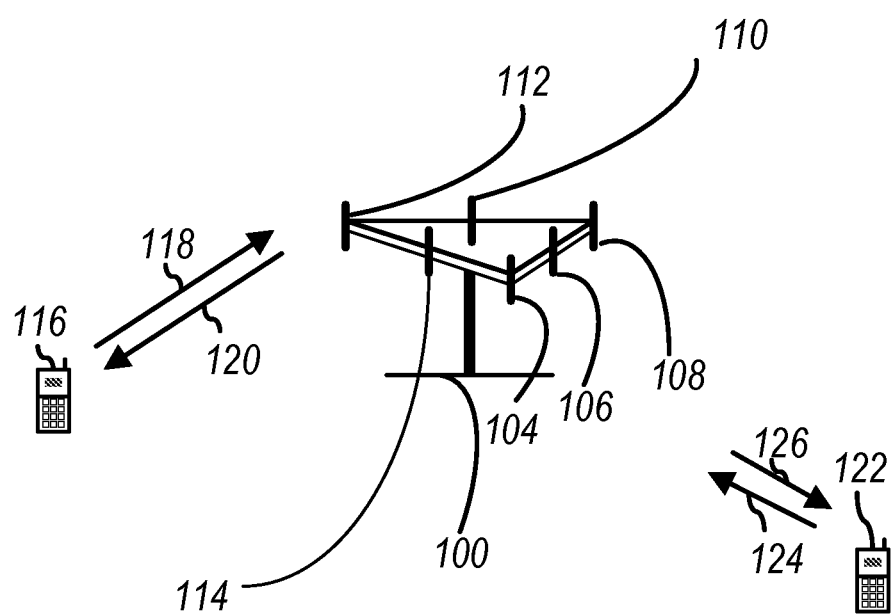
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
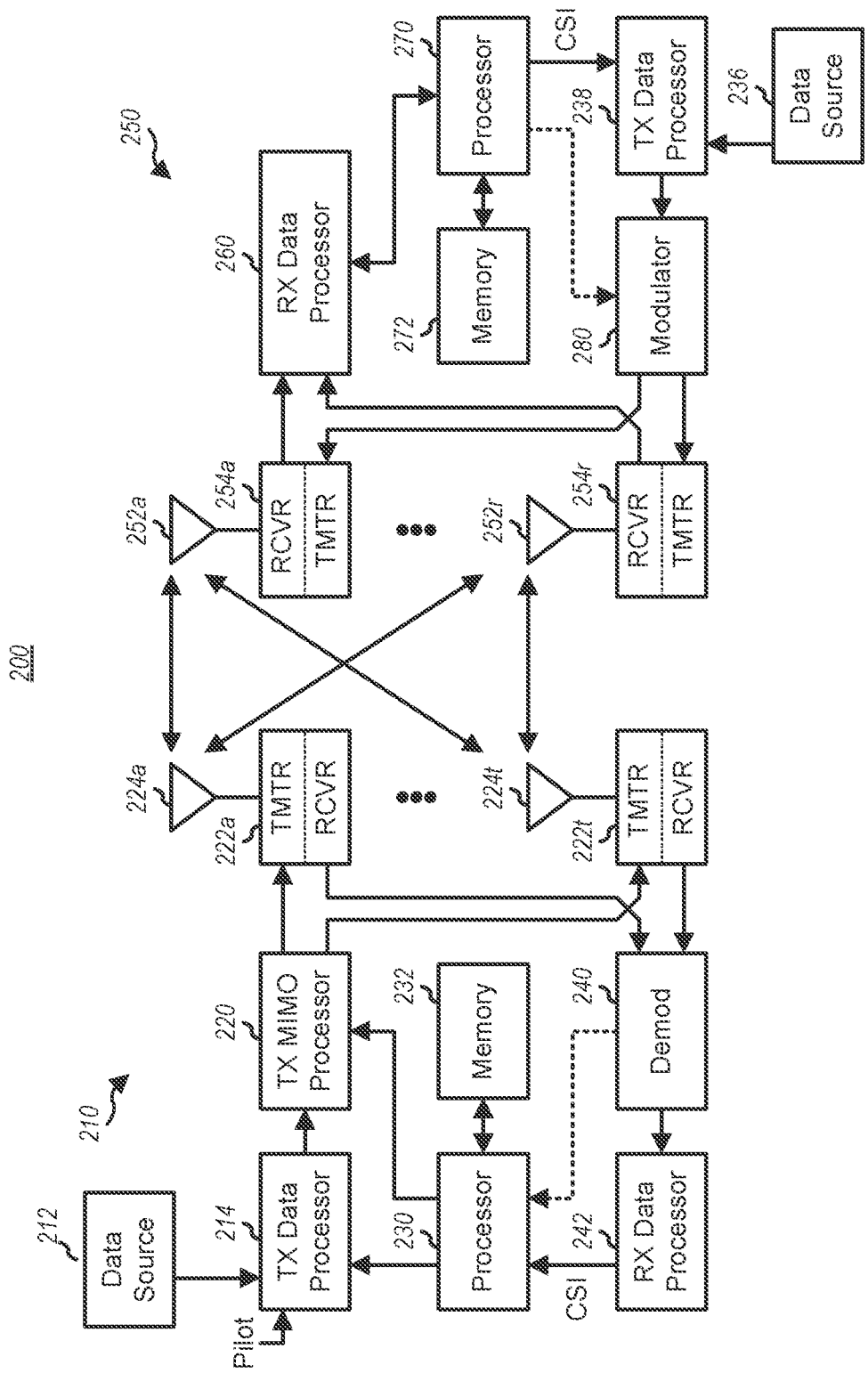
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g. BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g. amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
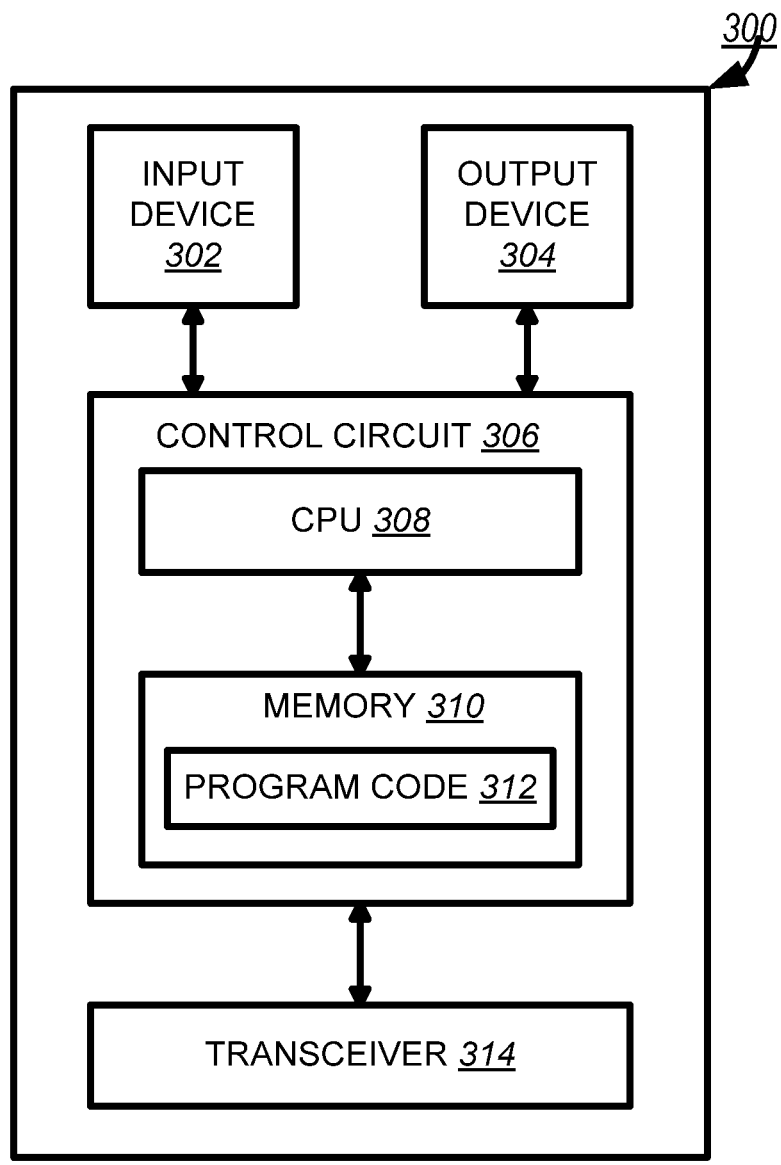
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
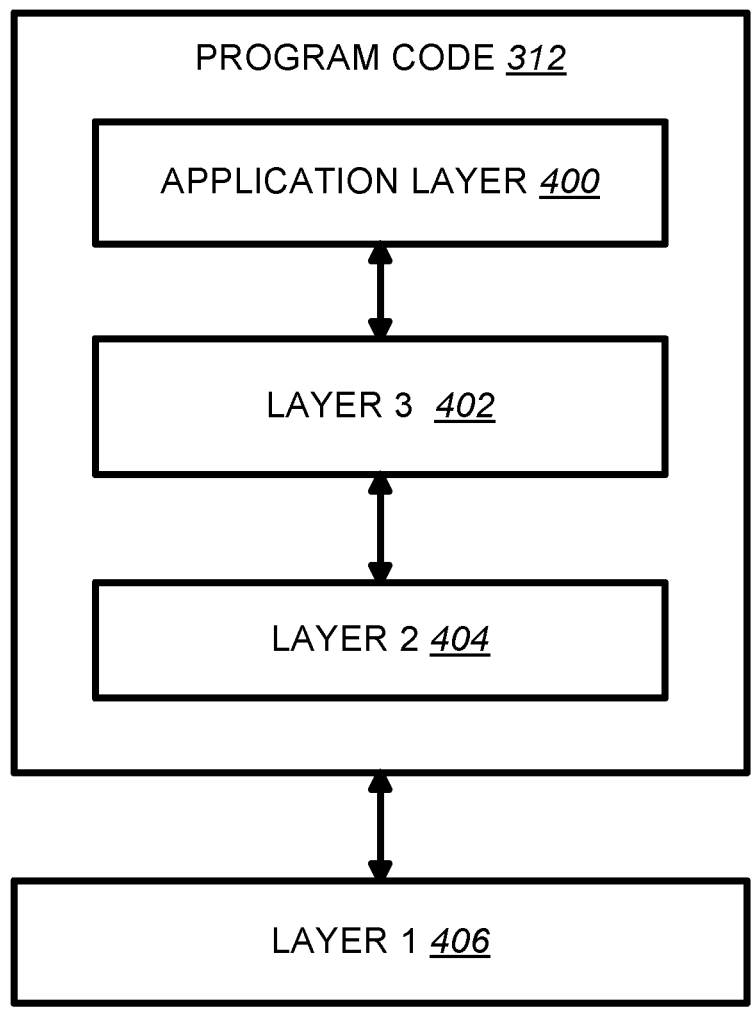
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item "study on latency reduction techniques for LTE" aims to investigate and standardize some techniques of latency reduction.

According to 3GPP RP-150465, the objective of the study item is to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both FDD (Frequency Division Duplex) and TDD (Time Division Duplex) duplex modes are considered.

According to 3GPP RP-150465, two following areas should be studies and documented:

Fast uplink access solutions

For active UEs and UEs that have been inactive a longer time, but are kept in RRC (Radio Resource Control) Connected, focus should be on reducing user plane latency for the scheduled UL (Uplink) transmission and getting a more resource efficient solution with protocol and signaling enhancements, compared to the pre-scheduling solutions allowed by the standard today, both with and without preserving the current TTI (Transmission Time Interval) length and processing times.

TTI shortening and reduced processing times

Assess specification impact and study feasibility and performance of TTI lengths between 0.5 ms and one OFDM (Orthogonal Frequency Division Multiplexing) symbol, taking into account impact on reference signals and physical layer control signaling.

TTI shortening and processing time reduction can be considered as an effective solution for reducing latency, as the time unit for transmission can be reduced, e.g. from 1 ms (14 OFDM) symbol to 1-7 OFDM symbols, and the delay caused by decoding can be reduced as well. Another benefit of shortening TTI length is to support a finer granularity of transport block (TB) size, so that unnecessary padding could be reduced. On the other hand, reducing the length of TTI may also have significant impact to current system design as the physical channels are developed based on 1 ms structure. A shortened TTI is also called a sTTI.

Frame structure used in New RAT (NR) for 5G, to accommodate various type of requirement (as discussed in 3GPP RP-150465) for time and frequency resource, e.g. from ultra-low latency (~0.5 ms) to delay-tolerant traffic for MTC (Machine-Type Communication), from high peak rate for eMBB (enhance Mobile Broadband) to very low data rate for MTC. An important focus of this study is low latency aspect, e.g. short TTI, while other aspect of mixing/adapting different TTIs can also be considered in the study. In addition to diverse services and requirements, forward compatibility is an important consideration in initial NR frame structure design as not all features of NR would be included in the beginning phase/release.

Reducing latency of protocol is an important improvement between different generations/releases, which can improve efficiency as well as meeting new application requirements, e.g. real-time service. An effective method frequently adopted to reduce latency is to reduce the length of TTIs, from 10 ms in 3G to 1 ms in LTE. In the context of LTE-A Pro in RE1-14, SI/WI was proposed to reduce the TTI to sub-ms level, e.g. 0.1-0.5 ms, by reducing the number of OFDM symbols within a TTI, without changing any existing LTE numerology, i.e. in LTE there is only one numerology. The target of this improvement can be to solve the TCP slow start issue, extremely low but frequent traffic, or to meet foreseen ultra-low latency in NR to some extent. Processing time reduction is another consideration to reduce the latency. It has not yet concluded that whether short TTI and short processing time always come together. The study suffers from some limitation, as the method adopted should preserve backward compatibility, e.g. the existence of legacy control region.

A brief description of LTE numerology is given in 3GPP TS 36.211 as follows:

6 Downlink 6.1 Overview

The smallest time-frequency unit for downlink transmission is denoted a resource element and is defined in clause 6.2.2.

A subset of the downlink subframes in a radio frame on a carrier supporting PDSCH transmission can be configured as MBSFN subframes by higher layers. Each MBSFN subframe is divided into a non-MBSFN region and an MBSFN region.

The non-MBSFN region spans the first one or two OFDM symbols in an MBSFN subframe where the length of the non-MBSFN region is given according to Sub-clause 6.7.

The MBSFN region in an MBSFN subframe is defined as the OFDM symbols not used for the non-MBSFN region.

For frame structure type 3, MBSFN configuration shall not be applied to downlink subframes in which at least one OFDM symbol is not occupied or discovery signal is transmitted. Unless otherwise specified, transmission in each downlink subframe shall use the same cyclic prefix length as used for downlink subframe #0.

6.1.1 Physical Channels

A downlink physical channel corresponds to a set of resource elements carrying information originating from higher layers and is the interface defined between 3GPP TS 36.212 [3] and the present document 3GPP TS 36.211.

The following downlink physical channels are defined:
Physical Downlink Shared Channel, PDSCH
Physical Broadcast Channel, PBCH
Physical Multicast Channel, PMCH
Physical Control Format Indicator Channel, PCFICH
Physical Downlink Control Channel, PDCCH
Physical Hybrid ARQ Indicator Channel, PHICH
Enhanced Physical Downlink Control Channel, EPDCCH
MTC Physical Downlink Control Channel, MPDCCH 6.1.2 Physical Signals A downlink physical signal corresponds to a set of resource elements used by the physical layer but does not carry information originating from higher layers. The following downlink physical signals are defined:
Reference signal
Synchronization signal
Discovery signal 6.2 Slot Structure and Physical Resource Elements 6.2.1 Resource Grid The transmitted signal in each slot is described by one or several resource grids of $N_{RB}^{DL} N_{sc}^{RB}$ subcarriers and $N_{symb}^{DL}$ OFDM symbols. The resource grid structure is illustrated in FIG. 6.2.2-1. The quantity $N_{RB}^{DL}$ depends on the downlink transmission bandwidth configured in the cell and shall fulfil $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of this specification.

The set of allowed values for $N_{RB}^{DL}$ is given by 3GPP TS 36.104 [6]. The number of OFDM symbols in a slot depends on the cyclic prefix length and subcarrier spacing configured and is given in Table 6.2.3-1.

An antenna port is defined such that the channel over which a symbol on the antenna port is conveyed can be inferred from the channel over which another symbol on the same antenna port is conveyed. For MBSFN reference signals, positioning reference signals, UE-specific reference signals associated with PDSCH and demodulation reference signals associated with EPDCCH, there are limits given below within which the channel can be inferred from one symbol to another symbol on the same antenna port. There is one resource grid per antenna port. The set of antenna ports supported depends on the reference signal configuration in the cell:

Cell-specific reference signals support a configuration of one, two, or four antenna ports and are transmitted on antenna ports p=0, p∈{0, 1}, and p∈{0, 1, 2, 3}, respectively.

MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.

UE-specific reference signals associated with PDSCH are transmitted on antenna port(s) p=5, p=7, p=8, or one or several of p∈{7, 8, 9, 10, 11, 12, 13, 14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Demodulation reference signals associated with EPDCCH are transmitted on one or several of p∈{107, 108, 109, 110}. The channel over which a symbol on one of these antenna ports is conveyed can be inferred from the channel over which another symbol on the same antenna port is conveyed only if the two symbols are in the same PRB pair.

Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15, 16, p=15, . . . , 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

6.2.2 Resource Elements

Each element in the resource grid for antenna port p is called a resource element and is uniquely identified by the index pair (k,l) in a slot where k=, . . . , $N_{RB}^{DL}N_{sc}^{RB}-1$ and =0, . . . , $N_{symb}^{DL}-1$ are the indices in the frequency and time domains, respectively. Resource element (k,l) on antenna port p corresponds to the complex value $a_{k,l}^{(p)}$.

When there is no risk for confusion, or no particular antenna port is specified, the index p may be dropped.

Figure 5:
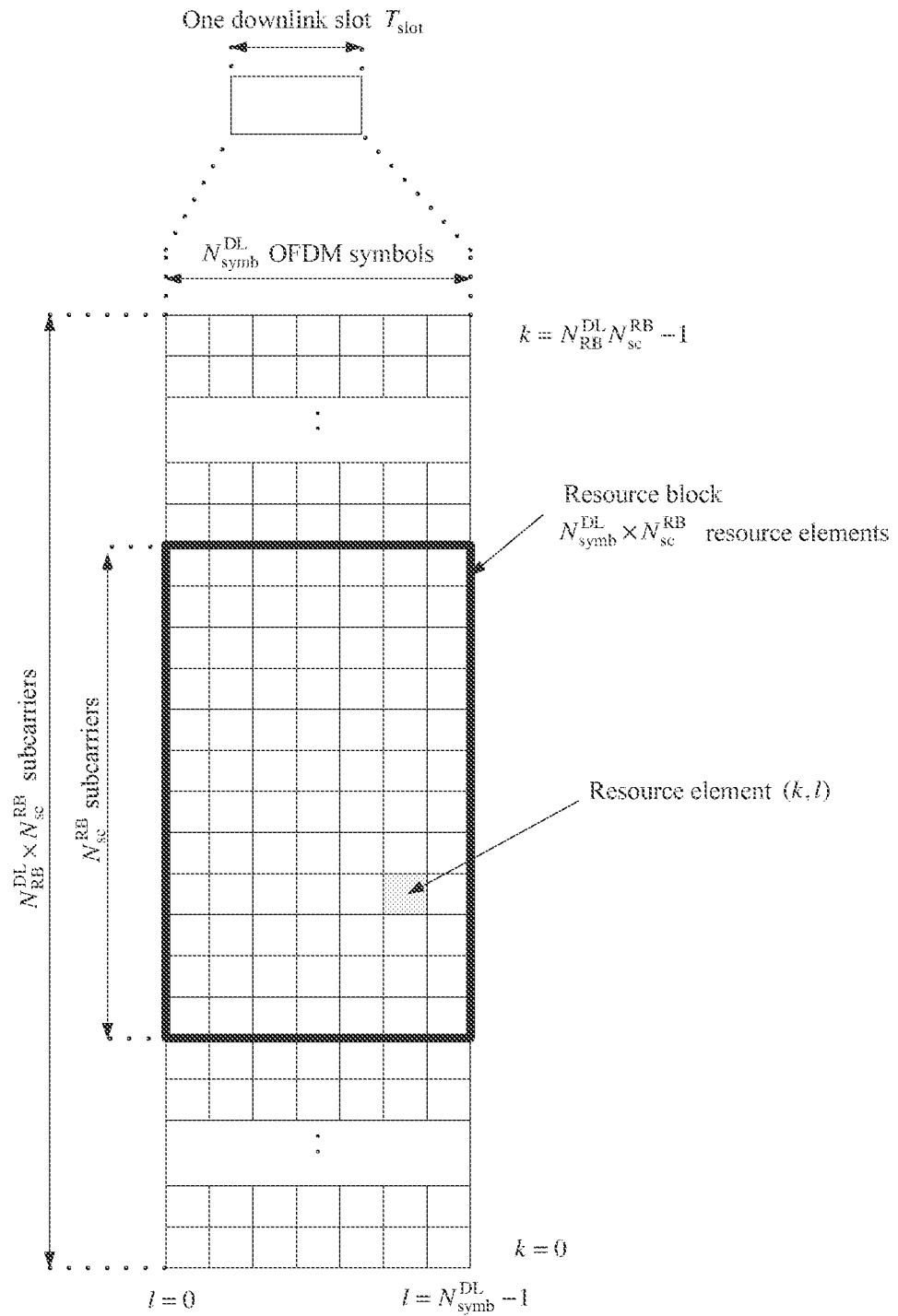
FIG. 5 is a reproduction of FIG. 6.2.2-1 of 3GPP TS 36.211 V13.1.0.

[FIG. 6.2.2-1 of 3GPP TS 36.211 V13.1.0, entitled "Downlink resource grid", is reproduced as FIG. 5]

6.2.3 Resource Blocks

Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1. A physical resource block thus consists of $N_{symb}^{DL} \times N_{sc}^{RB}$ resource elements, corresponding to one slot in the time domain and 180 kHz in the frequency domain. Physical resource blocks are numbered from 0 to $N_{RB}^{DL}-1$ in the frequency domain. The relation between the physical resource block number $n_{PRB}$ in the frequency domain and resource elements (k,l) in a slot is given by $$n_{PRB} = \left\lfloor \frac{k}{N_{sc}^{RB}} \right\rfloor$$

[Table 6.2.3-1 of 3GPP TS 36.211 V13.1.0, entitled "Physical resource blocks parameters", is reproduced as FIG. 6]

A physical resource-block pair is defined as the two physical resource blocks in one subframe having the same physical resource-block number $n_{PRB}$.

A virtual resource block is of the same size as a physical resource block. Two types of virtual resource blocks are defined:

Virtual resource blocks of localized type
Virtual resource blocks of distributed type For each type of virtual resource blocks, a pair of virtual resource blocks over two slots in a subframe is assigned together by a single virtual resource block number, $n_{VRB}$. [ . . . ]

6.12 OFDM Baseband Signal Generation

The time-continuous signal $s_l^{(p)}(t)$ on antenna port p in OFDM symbol l in a downlink slot is defined by $$s_l^{(p)}(t) = \sum_{k=-\lfloor N_{RB}^{DL}N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lfloor N_{RB}^{DL}N_{sc}^{RB}/2 \rfloor} a_{k^{(+)},l}^{(p)} \cdot e^{j2\pi k \Delta f(t-N_{CP,l}T_s)}$$

for $0 \le t < (N_{CP,l}+N) \times T_s$ where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor-1$. The variable N equals 2048 for $\Delta f=15$ kHz subcarrier spacing and 4096 for $\Delta f=7.5$ kHz subcarrier spacing. The OFDM symbols in a slot shall be transmitted in increasing order of l, starting with l=0, where OFDM symbol l>0 starts at time $\Sigma_{l'=0}^{l-1}(N_{CP,l'}+N)T_s$ within the slot. In case the first OFDM symbol(s) in a slot use normal cyclic prefix and the remaining OFDM symbols use extended cyclic prefix, the starting position the OFDM symbols with extended cyclic prefix shall be identical to those in a slot where all OFDM symbols use extended cyclic prefix. Thus there will be a part of the time slot between the two cyclic prefix regions where the transmitted signal is not specified.

Table 6.12-1 lists the value of $N_{CP,l}$ that shall be used. Note that different OFDM symbols within a slot in some cases have different cyclic prefix lengths.

[Table 6.12-1 of 3GPP TS 36.211 V13.1.0, entitled "OFDM parameters", is reproduced as FIG. 7]

6.13 Modulation and Upconversion

Modulation and upconversion to the carrier frequency of the complex-valued OFDM baseband signal for each antenna port is shown in FIGS. 6.13-1. The filtering required prior to transmission is defined by the requirements in 3GPP TS 36.104 [6].

Figures 8, 9:
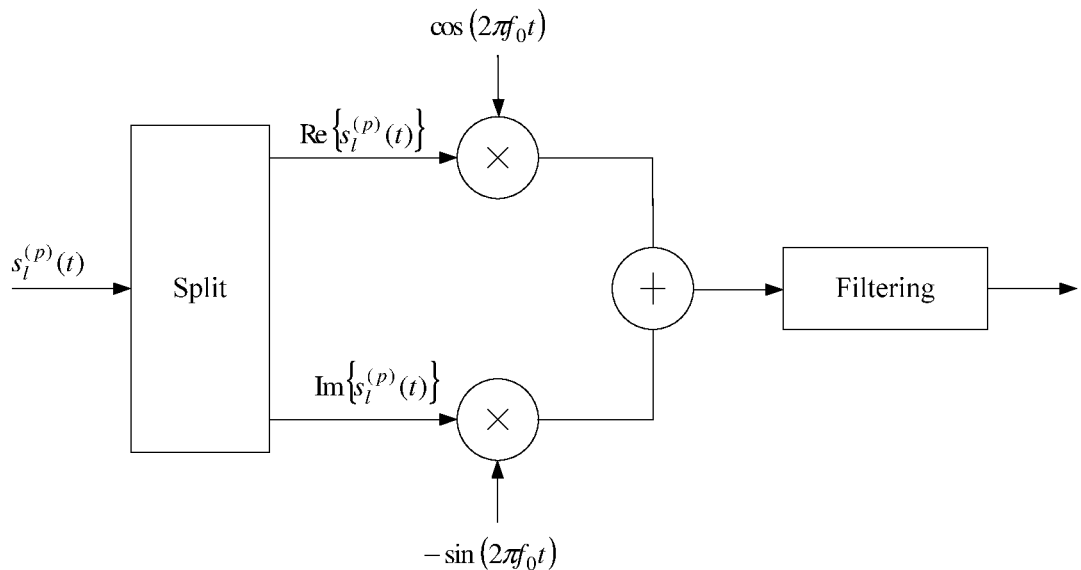
FIG. 8 is a reproduction of FIG. 6.13-1 of 3GPP TS 36.211 V13.1.0.
FIG. 9 is a reproduction of Table 6.11.1.1-1 of 3GPP TS 36.211 V13.1.0.

[FIGS. 6.13-1 of 3GPP TS 36.211 V13.1.0, entitled "Downlink modulation", is reproduced as FIG. 8]

In LTE, there is only one DL numerology defined for initial access, which is 15 KHz subcarrier spacing and the signal and channel to be acquired during initial access is based on 15 KHz numerology. To access a cell, UE may need to acquire some fundamental information. For example, UE first acquires time/frequency synchronization of cell, which is done during cell search or cell selection/reselection. The time/frequency synchronization can be obtained by receiving synchronization signal, such as primary synchronization signal (PSS)/secondary synchronization signal (SSS). During synchronization, the center frequency of a cell is known, and the subframe/frame boundary is obtained.

Cyclic prefix (CP) of the cell, e.g. normal CP or extended CP, physical cell id, duplex mode of the cell, e.g. FDD or TDD can be known as well when PSS (Primary Synchronization Signal)/SSS (Secondary Synchronization Signal) are acquired. And then, master information block (MIB) carried on physical broadcast channel (PBCH) is received, some fundamental system information, e.g. system frame number (SFN), system bandwidth, physical control channel related information. UE would receive the DL (downlink) control channel (e.g. PDCCH (Physical Downlink Control Channel)) on proper resource elements and with proper payload size according to the system bandwidth and can acquire some more system information required to access the cell in system information block (SIB), such as whether the cell can be access, UL bandwidth and frequency, random access parameter, and so on.

UE then can perform random access and request the connection to the cell. Cell specific reference signal (CRS) can be used for demodulating above mentioned DL channel, e.g. PBCH, DL control channel, or DL data channel. CRS can also be used to perform measurement for a cell/carrier since the power/content of CRS is known after reading MIB/SIB as mentioned above. After the connection set up is complete, UE would enter connected mode and be able to perform data transmission to the cell or perform data reception from the cell. The resource allocation for data reception and transmission is done according to system bandwidth (e.g. $N_{RB}^{DL}$ or $N_{RB}^{UL}$ in the following quotation) signaled in MIB or SIB. More details can be found in 3GPP TS 36.211, TS 36.212, TS 36.213, and TS 36.331 provide additional details as follows:

6.11 Synchronization Signals

There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

6.11.1 Primary Synchronization Signal (PSS)

6.11.1.1 Sequence Generation

The sequence d(n) used for the primary synchronization signal is generated from a frequency-domain Zadoff-Chu sequence according to $$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u is given by Table 6.11.1.1-1.

[Table 6.11.1.1-1 of 3GPP TS 36.211 V13.1.0, entitled "Root indices for the primary synchronization signal", is reproduced as FIG. 9]

6.11.1.2 Mapping to Resource Elements

The mapping of the sequence to resource elements depends on the frame structure. The UE shall not assume that the primary synchronization signal is transmitted on the same antenna port as any of the downlink reference signals. The UE shall not assume that any transmission instance of the primary synchronization signal is transmitted on the same antenna port, or ports, used for any other transmission instance of the primary synchronization signal. The sequence d(n) shall be mapped to the resource elements according to $$a_{k,l} = d(n), n = 0, \ldots, 61$$
$$k = n - 31 + \frac{N_{RB}^{DL} N_{sc}^{RB}}{2}$$

For frame structure type 1, the primary synchronization signal shall be mapped to the last OFDM symbol in slots 0 and 10.

For frame structure type 2, the primary synchronization signal shall be mapped to the third OFDM symbol in subframes 1 and 6. Resource elements (k,l) in the OFDM symbols used for transmission of the primary synchronization signal where $$k = n - 31 + \frac{N_{RB}^{DL} N_{sc}^{RB}}{2}$$
$$n = -5, -4, \ldots, -1, 62, 63, \ldots 66$$

are reserved and not used for transmission of the primary synchronization signal.

For frame structure type 3, the primary synchronization signal shall be mapped according to frame structure type 1 with the following exceptions:
 the primary synchronization signal shall be transmitted only if the corresponding subframe is non-empty and at least 12 OFDM symbols are transmitted,
 a primary synchronization signal being part of a discovery signal shall be transmitted in the last OFDM symbol of the first slot of a discovery signal occasion.

6.11.2 Secondary Synchronization Signal (SSS)

6.11.2.1 Sequence Generation

The sequence d(0), . . . , d(61) used for the second synchronization signal is an interleaved concatenation of two length-31 binary sequences. The concatenated sequence is scrambled with a scrambling sequence given by the primary synchronization signal.

The combination of two length-31 sequences defining the secondary synchronization signal differs between subframes according to $$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases}$$

$$d(2n+1) = \begin{cases} s_1^{(m_1)}(n)c_1(n)z_1^{(m_0)}(n) & \text{in subframes } 0, 1, 2, 3, 4 \\ s_0^{(m_0)}(n)c_1(n)z_1^{(m_1)}(n) & \text{in subframes } 5, 6, 7, 8, 9 \end{cases}$$

where $0 \leq n \leq 30$. The indices $m_0$ and $m_1$ are derived from the physical-layer cell-identity group $N_{ID}^{(1)}$ according to $$m_0 = m' \bmod 31$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

where the output of the above expression is listed in Table 6.11.2.1-1.

The two sequences $s_0^{(m_0)}(n)$ and $s_1^{(m_1)}(n)$ are defined as two different cyclic shifts of the m-sequence $\tilde{s}(n)$ according to $$s_0^{(m_0)}(n) = \tilde{s}((n+m_0) \bmod 31)$$

$$s_1^{(m_1)}(n) = \tilde{s}((n+m_1) \bmod 31)$$

where $\tilde{s}(i) = 1 - 2x(i)$, $0 \leq i \leq 30$, is defined by $$x(\bar{i}+5) = (x(\bar{i}+2) + x(\bar{i})) \bmod 2, \quad 0 \leq \bar{i} \leq 25$$

with initial conditions $x(0)=0$, $x(1)=0$, $x(2)=0$, $x(3)=0$, $x(4)=1$.

The two scrambling sequences $c_0(n)$ and $c_1(n)$ depend on the primary synchronization signal and are defined by two different cyclic shifts of the m-sequence $\tilde{c}(n)$ according to $$c_0(n) = \tilde{c}((n + N_{ID}^{(2)}) \bmod 31)$$

$$c_1(n) = \tilde{c}((n + N_{ID}^{(2)} + 3) \bmod 31)$$

where $N_{ID}^{(2)} \in \{0, 1, 2\}$ is the physical-layer identity within the physical-layer cell identity group $N_{ID}^{(1)}$ and $\tilde{c}(i) = 1 - 2x(i)$, $0 \leq i \leq 30$, is defined by $$x(\bar{i}+5) = (x(\bar{i}+3) + x(\bar{i})) \bmod 2, \quad 0 \leq \bar{i} \leq 25$$

with initial conditions $x(0)=0$, $x(1)=0$, $x(2)=0$, $x(3)=0$, $x(4)=1$.

The scrambling sequences $z_1^{(m_0)}(n)$ and $z_1^{(m_1)}(n)$ are defined by a cyclic shift of the m-sequence $\tilde{z}(n)$ according to $$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$

where $m_0$ and $m_1$ are obtained from Table 6.11.2.1-1 and $\tilde{z}(i) = 1 - 2x(i)$, $0 \leq i \leq 30$, is defined by $$x(\bar{i}+5) = (x(\bar{i}+4) + x(\bar{i}+2) + x(\bar{i}+1) + x(\bar{i})) \bmod 2, \quad 0 \leq \bar{i} \leq 25$$

with initial conditions $x(0)=0$, $x(1)=0$, $x(2)=0$, $x(3)=0$, $x(4)=1$.

[Table 6.11.2.1-1 of 3GPP TS 36.211 V13.1.0, entitled "Mapping between physical-layer cell-identity group $N_{ID}^{(1)}$ and the indices $m_0$ and $m_1$", is reproduced as FIG. 10]

6.11.2.2 Mapping to Resource Elements

The mapping of the sequence to resource elements depends on the frame structure. In a subframe for frame structure type 1 and 3 and in a half-frame for frame structure type 2, the same antenna port as for the primary synchronization signal shall be used for the secondary synchronization signal.

The sequence $d(n)$ shall be mapped to resource elements according to $$a_{k,l} = d(n), \quad n = 0, \ldots, 61$$

$$k = n - 31 + \frac{N_{RB}^{DL} N_{sc}^{RB}}{2}$$

$$l = \begin{cases} N_{symb}^{DL} - 2 & \text{in slots 0 and 10} & \text{for frame structure type 1} \\ N_{symb}^{DL} - 1 & \text{in slots 1 and 11} & \text{for frame structure type 2} \\ N_{symb}^{DL} - 2 & \text{in slots where the } PSS \text{ is transmitted} & \text{for frame structure type 3} \end{cases}$$

Resource elements (k,l) where $$k = n - 31 + \frac{N_{RB}^{DL} N_{sc}^{RB}}{2}$$

$$l = \begin{cases} N_{symb}^{DL} - 2 & \text{in slots 0 and 10} & \text{for frame structure type 1} \\ N_{symb}^{DL} - 1 & \text{in slots 1 and 11} & \text{for frame structure type 2} \\ N_{symb}^{DL} - 2 & \text{in slots where the } PSS \text{ is transmitted} & \text{for frame structure type 3} \end{cases}$$

$$n = -5, -4, \ldots, -1, 62, 63, \ldots 66$$

are reserved and not used for transmission of the secondary synchronization signal.

6.11 A Discovery Signal

A discovery signal occasion for a cell consists of a period with a duration of
- one to five consecutive subframes for frame structure type 1
- two to five consecutive subframes for frame structure type 2
- 12 OFDM symbols within one non-empty subframe for frame structure type 3 where the UE in the downlink subframes may assume presence of a discovery signal consisting of
- cell-specific reference signals on antenna port 0 in all downlink subframes and in DwPTS of all special subframes in the period for frame structure type 1 and 2
- cell specific reference signals on antenna port 0 when higher layer parameters indicate only one configured antenna port for cell specific reference signals for a serving cell using frame structure type 3
- cell specific reference signals on antenna port 0 and antenna port 1 when higher layer parameters indicate at least two configured antenna ports for cell specific reference signals for a serving cell using frame structure type 3
- cell specific reference signals on antenna port 0 and antenna port 1 when higher layer configured parameter presenceAntennaPort1 is signalled to be 1, for a neighbour cell when using frame structure type 3
- primary synchronization signal in the first subframe of the period for frame structure types 1 and 3 or the second subframe of the period for frame structure type 2,
- secondary synchronization signal in the first subframe of the period, and
- non-zero-power CSI reference signals in zero or more subframes in the period. The configuration of non-zero-power CSI reference signals part of the discovery signal is obtained as described in clause 6.10.5.2

For frame structures 1 and 2 the UE may assume a discovery signal occasion once every dmtc-Periodicity.

For frame structure type 3, the UE may assume a discovery signal occasion may occur in any subframe within the discovery signals measurement timing configuration in clause 5.5.2.10 of [9].

For frame structure type 3, simultaneous transmission of a discovery signal and PDSCH/PDCCH/EPDCCH may occur in subframes 0 and 5 only.

For frame structure type 3, the UE may assume that a discovery signal occasion occurs in the first subframe containing a primary synchronization signal, secondary synchronization signal and cell-specific reference signals within the discovery measurement timing configuration in clause 5.5.2.10 of [9].

[ . . . ]

6.6 Physical Broadcast Channel

The PBCH is not transmitted for frame structure type 3.

6.6.1 Scrambling

The block of bits $b(0), \ldots, b(M_{bit}-1)$, where $M_{bit}$, the number of bits transmitted on the physical broadcast channel, equals 1920 for normal cyclic prefix and 1728 for extended cyclic prefix, shall be scrambled with a cell-specific sequence prior to modulation, resulting in a block of scrambled bits $\tilde{b}(0) \ldots, \tilde{b}(M_{bit}-1)$ according to $$\tilde{b}(i)=(b(i)+c(i)) \bmod 2$$

where the scrambling sequence c(i) is given by clause 7.2.

The scrambling sequence shall be initialised with $c_{init}=N_{ID}^{cell}$ in each radio frame fulfilling $n_f \bmod 4=0$.

6.6.2 Modulation

The block of scrambled bits $\tilde{b}(0), \ldots, \tilde{b}(M_{bit}-1)$ shall be modulated as described in clause 7.1, resulting in a block of complex-valued modulation symbols $d(0), \ldots, d(M_{symb}-1)$. Table 6.6.2-1 specifies the modulation mappings applicable for the physical broadcast channel.

[Table 6.6.2-1 of 3GPP TS 36.211 V13.1.0, entitled "PBCH modulation schemes", is reproduced as FIG. 11]

6.6.3 Layer Mapping and Precoding

The block of modulation symbols $d(0), \ldots, d(M_{symb}-1)$ shall be mapped to layers according to one of clauses 6.3.3.1 or 6.3.3.3 with $M_{symb}^{layer}=M_{symb}$ and precoded according to one of clauses 6.3.4.1 or 6.3.4.3, resulting in a block of vectors $y(i)=[y^{(0)}(i) \ldots y^{(P-1)}(i)]^T$, $i=0, \ldots, M_{symb}-1$, where $y^{(p)}(i)$ represents the signal for antenna port p and where $p=0, \ldots, P-1$ and the number of antenna ports for cell-specific reference signals $P \in \{1, 2, 4\}$.

6.6.4 Mapping to Resource Elements

The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$ and shall be mapped in sequence starting with y(0) to resource elements (k,l) constituting the core set of PBCH resource elements. The mapping to resource elements (k,l) not reserved for transmission of reference signals shall be in increasing order of first the index k, then the index l in slot 1 in subframe 0 and finally the radio frame number. The resource-element indices are given by $$k = \frac{N_{RB}^{DL} N_{sc}^{RB}}{2} - 36 + k', k' = 0, 1, \ldots, 71$$

$$l = 0, 1, \ldots, 3$$

where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH transmission. The UE shall not make any other assumptions about these resource elements.

If a cell is configured with repetition of the physical broadcast channel
- symbols mapped to core resource element (k,l) in slot 1 in subframe 0 within a radio frame $n_f$ according to the mapping operation above, and
- cell-specific reference signals in OFDM symbols 1 in slot 1 in subframe 0 within a radio frame $n_f$ with l according to the mapping operation above shall additionally be mapped to resource elements (k,l') in slot number $n_s'$ within radio frame $n_f$-i unless resource element (k,l') is used by CSI reference signals.

For frame structure type 1, l', $n_s'$, and i are given by Table 6.6.4-1.

For frame structure type 2,
if $N_{RB}^{DL}>15$, l' and $n_s'$, are given by Table 6.6.4-2 and i=0;
if $7 \leq N_{RB}^{DL} \leq 15$, l' and $n_s'$, are given by Table 6.6.4-2 and i=0, except that repetitions with $n_s'=10$ and $n_s'=11$ are not applied.

For both frame structure type 1 and frame structure type 2, repetition of the physical broadcast channel is not applicable if $N_{RB}^{DL}=6$.

Resource elements already used for transmission of cell-specific reference signals in absence of repetition shall not be used for additional mapping of cell-specific reference signals.

[Table 6.6.4-1 of 3GPP TS 36.211 V13.1.0, entitled "Frame offset, slot and symbol number triplets for repetition of PBCH for frame structure type 1", is reproduced as FIG. 12]

[Table 6.6.4-2 of 3GPP TS 36.211 V13.1.0, entitled "Slot and symbol number pairs for repetition of PBCH for frame structure type 2", is reproduced as FIG. 13]

[ . . . ]

6.10.1 Cell-Specific Reference Signal (CRS)

The UE may assume cell-specific reference signals are, unless otherwise stated in [4, clause 12], transmitted in
 all downlink subframes for frame structure type 1,
 all downlink subframes and DwPTS for frame structure type 2,
 non-empty subframes for frame structure type 3
in a cell supporting PDSCH transmission.

Cell-specific reference signals are transmitted on one or several of antenna ports 0 to 3.

Cell-specific reference signals are defined for $\Delta f=15$ kHz only.

6.10.1.1 Sequence Generation

The reference-signal sequence $r_{l,n_s}(m)$ is defined by $$r_{l,n_s}(m) = 1/\sqrt{2}(1-2\cdot c(2m)) + j1/\sqrt{2}(1-2\cdot c(2m+1)),$$
$$m=0,1,\ldots,2N_{RB}^{max,DL}-1$$

where $n_s$ is the slot number within a radio frame and l is the OFDM symbol number within the slot. The pseudo-random sequence c(i) is defined in clause 7.2. The pseudo-random sequence generator shall be initialised with $c_{init}=2^{10}\cdot(7\cdot(n_s'+1)+l+1)\cdot(2\cdot N_{ID}^{cell}+1)+2\cdot N_{ID}^{cell}+N_{CP}$ at the start of each OFDM symbol where $$n_s' = \begin{cases} 10\lfloor n_s/10 \rfloor + n_s \bmod 2 & \text{for frame structure type 3 when the CRS is part of a DRS} \\ n_s & \text{otherwise} \end{cases}$$

$$N_{CP} = \begin{cases} 1 & \text{for normal CP} \\ 0 & \text{for extended CP} \end{cases}$$

6.10.1.2 Mapping to Resource Elements

The reference signal sequence $r_{l,n_s}(m)$ shall be mapped to complex-valued modulation symbols $a_{k,l}^{(p)}$ used as reference symbols for antenna port p in slot $n_s$ according to $$a_{k,l}^{(p)} = r_{l,n_s}(m')$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2\cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by $v_{shift}=N_{ID}^{cell} \bmod 6$.

Resource elements (k,l) used for transmission of cell-specific reference signals on any of the antenna ports in a slot shall not be used for any transmission on any other antenna port in the same slot and set to zero.

In an MBSFN subframe, cell-specific reference signals shall only be transmitted in the non-MBSFN region of the MBSFN subframe.

FIGS. 6.10.1.2-1 and 6.10.1.2-2 illustrate the resource elements used for reference signal transmission according to the above definition. The notation R, is used to denote a resource element used for reference signal transmission on antenna port p.

Figure 14A:
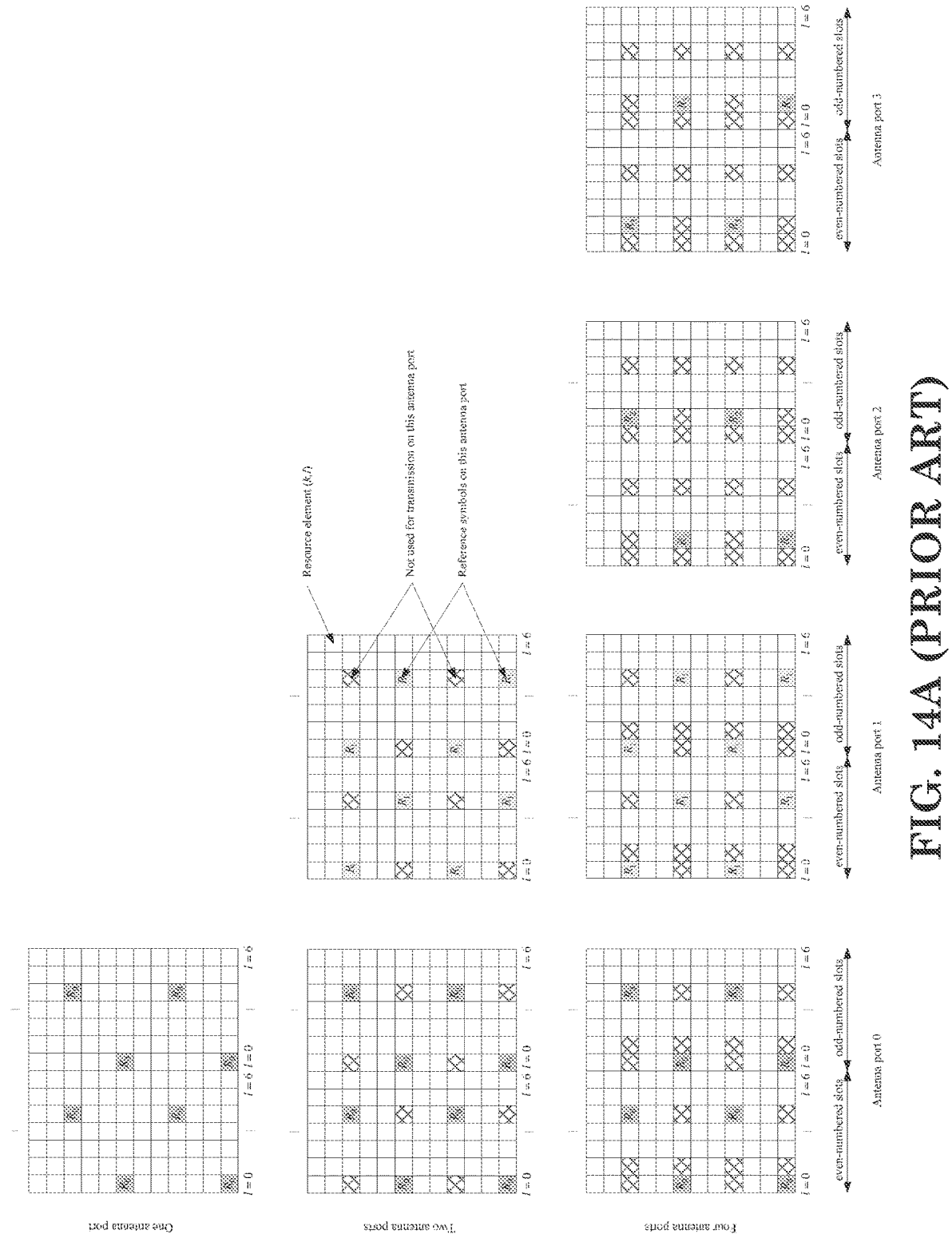
FIG. 14A is a reproduction of FIG. 6.10.1.2-1 of 3GPP TS 36.211 V13.1.0.

[FIG. 6.10.1.2-1 of 3GPP TS 36.211 V13.1.0, entitled "Mapping of downlink reference signals (normal cyclic prefix), is reproduced as FIG. 14A]

Figure 14B:
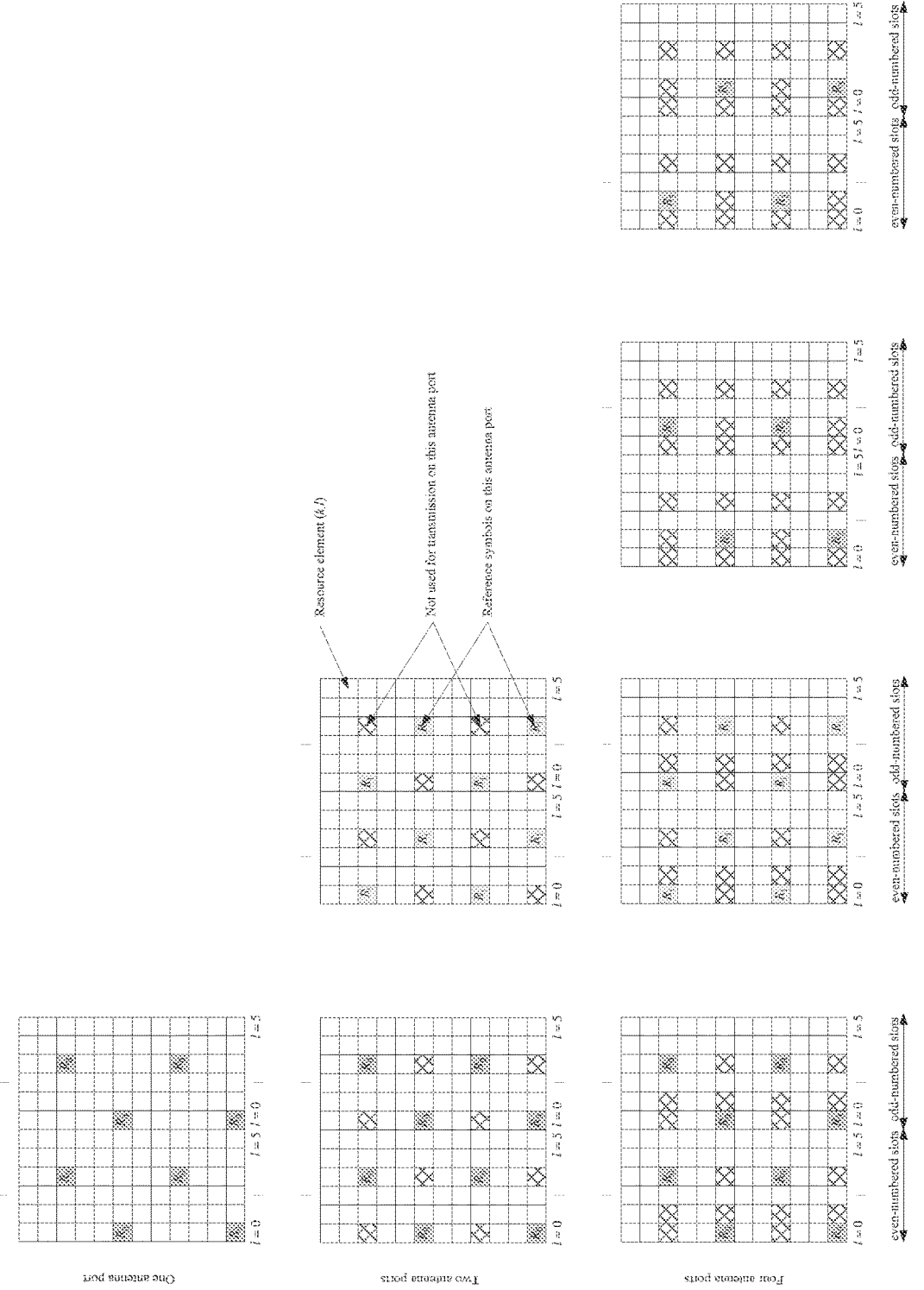
FIG. 14B is a reproduction of FIG. 6.10.1.2-2 of 3GPP TS 36.211 V13.1.0.

[FIG. 6.10.1.2-2 of 3GPP TS 36.211 V13.1.0, entitled "Mapping of downlink reference signals (extended cyclic prefix), is reproduced as FIG. 14B]

[ . . . ]

MasterInformationBlock

The MasterInformationBlock includes the system information transmitted on BCH.

Signalling radio bearer: N/A
RLC-SAP: TM
Logical channel: BCCH
Direction: E-UTRAN to UE MasterInformationBlock

```
-- ASN1START
MasterInformationBlock ::=      SEQUENCE {
    dl-Bandwidth                ENUMERATED {
                                  n6, n15, n25, n50, n75, n100},
    phich-Config                PHICH-Config,
    systemFrameNumber           BIT STRING (SIZE (8)),
    schedulingInfoSIB1-BR-r13   INTEGER (0..31),
    spare                       BIT STRING (SIZE (5))
}
-- ASN1STOP
```

| MasterInformationBlock field descriptions |
| --- |
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| phich-Config |
| Specifies the PHICH configuration. If the UE is a BL UE or UE in CE, it shall ignore this field. |
| schedulingInfoSIB1-BR |
| This field contains an index to a table that defines SystemInformationBlockType1-BR scheduling information. The table is specified in TS 36.213 [23, Table 7.1.6-1 and Table 7.1.7.2.7-1]. Value 0 means that SystemInformationBlockType1-BR is not scheduled. |
| systemFrameNumber |
| Defines the 8 most significant bits of the SFN. As indicated in TS 36.211 [21, 6.6.1], the 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |

When receiving data, physical resource block (PRB) bundling can be conducted to improve the performance of reception. A set of physical resource blocks consecutive in frequency domain can be grouped into precoding resource block groups (PRGs). When UE is configured with some transmission mode, or when UE is configured with some channel state information (CSI) reporting type, or when UE is configured with PRB bundling operation, UE could assume the same transmission technic is applied to resource blocks within a same PRG, e.g. using a same precoder or using a same beam to transmit resource blocks within a same PRG.

Therefore, when UE receive the resource blocks within a same PRG, the process of reception can be done jointly as well. For example, when UE demodulates the resource blocks within a same PRG, channel estimation of the PRBs can be done jointly as the PRBs are closed in frequency domain and transmit in a same way so that the channel for the PRBs can be assumed to be identical. For example, if there are three PRBs (including PRB A, PRB B, and PRB C) within a PRG, reference signals within PRB A, PRB B, and PRB C can all be used to derive the channel and data within PRB A, PRB B, and PRB C can be demodulated assuming the derived channel.

Comparing with using reference signal within PRB A to derive a channel to demodulate data within PRB A, deriving channel jointly can improve the accuracy of channel estimation, as the number of resource occupied by reference signal would be increased to three time in the example. Also, the channel estimation can be more robust given more samples of reference signal is measured, such that if some resource of reference signal is interference by other signal, averaging all samples can eliminate the impact of interference. As channel estimation with PRB bundling can be improved, the quality of reception can also be improved, e.g. bit error rate (BER), block error rate (BLER), throughput, or data rate. Additional detail can be found in 3GPP TS 36.213 as follows:

7.1.6.5 Physical Resource Block (PRB) Bundling

A UE configured for transmission mode 9 for a given serving cell c may assume that precoding granularity is multiple resource blocks in the frequency domain when PMI/RI reporting is configured.

For a given serving cell c, if a UE is configured for transmission mode 10 if PMI/RI reporting is configured for all configured CSI processes for the serving cell c, the UE may assume that precoding granularity is multiple resource blocks in the frequency domain, otherwise, the UE shall assume the precoding granularity is one resource block in the frequency domain.

Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL} - P' \lfloor N_{RB}^{DL}/P' \rfloor$. The PRG size is non-increasing starting at the lowest frequency. The UE may assume that the same precoder applies on all scheduled PRBs within a PRG.

If the UE is a BL/CE UE P'=3 otherwise the PRG size a UE may assume for a given system bandwidth is given by:
[Table 7.1.6.5-1 of 3GPP TS 36.213 V13.1.1 is reproduced as FIG. 15]

When it comes to NR, the story becomes somehow different, as backward compatibility is not a must. Numerology can be adjusted so that reducing symbol number of a TTI would not be the only tool to change TTI length. Using LTE numerology as an example, it comprises 14 OFDM symbol in 1 ms and a subcarrier spacing of 15 KHz. When the subcarrier spacing goes to 30 KHz, under the assumption of same FFT size and same CP structure, there would be 28 OFDM symbols in 1 ms, equivalently the TTI become 0.5 ms if the number of OFDM symbol in a TTI is kept the same. This implies the design between different TTI lengths can be kept common, with good scalability performed on the sub-carrier spacing. Of course there would always be trade-off for the subcarrier spacing selection, e.g. FFT size, definition/number of PRB, the design of CP, supportable system bandwidth, etc. While as NR considers larger system bandwidth, and larger coherence bandwidth, inclusion of a larger sub carrier spacing is a nature choice.

As discussed above, it is generally very difficult to fulfill all diverse requirements with a single numerology. Therefore, it is agreed in the very first meeting that more than one numerology would be adopted. Furthermore, considering the standardization effort, implementation efforts, as well as multiplexing capability among different numerologies, it would be beneficial to have some relationship between different numerologies, such as integral multiple relationship. Several numerology families, were raised, one of them is based on LTE 15 KHz, and some other numerologies (Alt2-4 below) which allows power N of 2 symbols in 1 ms:

For NR, it is necessary to support more than one values of subcarrier-spacing
    Values of subcarrier-spacing are derived from a particular value of subcarrier-spacing multiplied by N where N is an integer
        Alt.1: Subcarrier-spacing values include 15 kHz subcarrier-spacing (i.e., LTE based numerology)
        Alt.2: Subcarrier-spacing values include 17.5 kHz subcarrier-spacing with uniform symbol duration including CP length
        Alt.3: Subcarrier-spacing values include 17.06 kHz subcarrier-spacing with uniform symbol duration including CP length
        Alt.4: Subcarrier-spacing values 21.33 kHz
        Note: other alternatives are not precluded
        FFS: exact value of a particular value and possible values of N
    The values of possible subcarrier-spacing will be further narrowed-down in RAN1 #85

Also, whether there would be restriction on the multiplier of a given numerology family is also discussed, power of 2 (Alt 1 below) drew some interests as it can multiplex different numerology easier without introducing much overhead when different numerologies is multiplexed in time domain:

RAN1 will continue further study and conclude between following alternatives in the next meeting
    Alt. 1:
        The subcarrier spacing for the NR scalable numerology should scale as $$f_{sc}=f_0*2^m$$

where
            $f_0$ is FFS
            m is an integer chosen from a set of possible values
    Alt. 2:
        The subcarrier spacing for the NR scalable numerology should scale as $$f_{sc}=f_0*M$$

where
            $f_0$ is FFS
            M is an integer chosen from a set of possible positive values Usually, RAN1 works as band agnostic manner, i.e. a scheme/feature would be assumed to be applicable for all frequency bands and in the following RAN4 would derive relevant test case considering if some combination is unrealistic or deployment can be done reasonably. This rule would still be assumed in NR, while some companies do see there would be restriction for sure as the frequency range of NR is quite high:

For the study of NR, RAN1 assumes that multiple (but not necessarily all) OFDM numerologies can apply to the same frequency range
        Note: RAN1 does not assume to apply very low value of subcarrier spacing to very high carrier frequency Furthermore, the synchronization signal/reference signal design in NR may be quite different from that in LTE. For example, a synchronization signal (e.g. SS block) periodicity may be 10 or 20 ms comparing with 5 ms periodicity in LTE. Besides, a base station might adjust the synchronization signal periodicity to a longer value considering all aspect, e.g. traffic or power consumption, unlike a fixed assumed periodicity in LTE. Also, CRS which is available in every subframe is likely to be removed from NR considering the huge amount of overhead and constant power consumption.

Agreements:
    RAN1 considers following parameter sets with associated default subcarrier spacing and possible maximum transmission bandwidth for NR-SS design
        Parameter set #W associated with 15 kHz subcarrier spacing and NR-SS transmission bandwidth no larger than 5 MHz
        Parameter set #X associated with 30 kHz subcarrier spacing and NR-SS transmission bandwidth no larger than 10 MHz
        Parameter set #Y associated with 120 kHz subcarrier spacing and NR-SS transmission bandwidth no larger than 40 MHz
        Parameter set #Z associated with 240 kHz subcarrier spacing and NR-SS transmission bandwidth no larger than 80 MHz
    Note that association between a frequency band and single set of default parameters (SCS, sequence length, NR-SS transmission bandwidth) will be defined in RAN4
    Note that each subcarrier spacing is associated with single sequence length and transmission bandwidth
    Note that additional parameter set or further down selection of parameter set is not precluded
    This agreement does not preclude any subcarrier spacing for data channel Agreements:
    For set of possible SS block time locations, further evaluation till next meeting by considering at least the following:
        Whether or not a SS block comprises of consecutive symbols and whether or not SS&PBCH in the same or different slots
        Number of symbols per SS block
        Whether or not to map across slot boundary(ies)
        Whether or not to skip symbol(s) within a slot or a slot set
        Contents of an SS block (note: the contents of an SS block may be further discussed during this meeting)
        How SS blocks are arranged within a burst set, & the # of SS blocks per burst/burst set Agreements:
    The maximum number of SS-blocks, L, within SS burst set may be carrier frequency dependent
        For frequency range category #A (e.g., 0~6 GHz), the number (L) is TBD within L≤[16]
        For frequency range category #B (e.g., 6~60 GHz), the number is TBD within L≤[128]
        FFS: L for additional frequency range category
    The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks
        FFS whether this information is available only in CONNECTED mode or in both modes
        FFS how to signal the position(s)

Agreements:
    For detecting non-standalone NR cell, NR should support adaptation and network indication of SS burst set periodicity and information to derive measurement timing/duration (e.g., time window for NR-SS detection)

For detecting non-standalone NR cell, network provides one SS burst set periodicity information per frequency carrier to UE and information to derive measurement timing/duration if possible
In case that one SS burst set periodicity and one information regarding timing/duration are indicated, UE assumes the periodicity and timing/duration for all cells on the same carrier
RAN1 recommends short measurement duration than configured periodicity e.g., 1, 5 or 10 ms
Note that L1/L3 filtering across multiple periods is still allowed
FFS more than one periodicity/timing/duration indication
NR should support set of SS burst set periodicity values for adaptation and network indication
Candidate periodicity values to be evaluated are [20, 40, 80 and 160 ms]
FFS other values with consideration for functionalities provided by NR-SS in connected mode
FFS whether to support NR-PBCH in non-standalone NR cell Agreements:
For initial cell selection for NR cell, UE assume the following default SS burst set periodicity
For carrier frequency range category #A: TBD among 10, 20 ms
E.g. range for #A (0-6 GHz)
For carrier frequency range category #B: TBD among 10, 20 ms
E.g. range for #B (6 GHz-60 GHz)
Down-selection will consider the SS block dimensions, initial access latency, power consumption, detection performance aspects into account. Other considerations are not precluded.
Note that this does not preclude further sub-categorization of frequency ranges. And additional frequency sub-ranges defined shall support a single default SS burst set periodicity, value selected between 10, 20 ms
Note that this does not preclude additional categorization of frequency ranges not covered by #A and #B. SS burst set periodicity for potential additional frequency ranges is FFS
RAN4 will determine the exact values of frequency ranges
The exact frequency ranges for category #A and #B is subject to further discussion in RAN1 and RAN1 will provide input to RAN4 to finalize the exact values.
Note that UE is not expected to detect cell that do not conform to the default SS burst set periodicity
RAN1 will definitely down select the values from 10, 20 ms in the next meeting Agreements:
For CONNECTED and IDLE mode UEs, NR should support network indication of SS burst set periodicity and information to derive measurement timing/duration (e.g., time window for NR-SS detection)
Network provides one SS burst set periodicity information per frequency carrier to UE and information to derive measurement timing/duration if possible
In case that one SS burst set periodicity and one information regarding timing/duration are indicated, UE assumes the periodicity and timing/duration for all cells on the same carrier
RAN1 recommends shorter measurement duration than configured periodicity e.g., 1, 5 or 10 ms
Note that L1/L3 filtering across multiple periods is still allowed
FFS more than one periodicity/timing/duration indication
If the network does not provide indication of SS burst set periodicity and information to derive measurement timing/duration the UE should assume 5 ms as the SS burst set periodicity
NR should support set of SS burst set periodicity values for adaptation and network indication
Candidate periodicity values to be evaluated are [5, 10, 20, 40, 80, and 160 ms]

To fulfill the requirements of data rate, it is expected that NR needs to support a total bandwidth of above 1 GHz. It may be achieved via aggregating a larger amount of carriers with smaller carrier bandwidth of or via aggregating a smaller amount of carriers with larger carrier bandwidth. Tradeoff between the two options may be complexity and efficiency. While anyway NR would support a much wider bandwidth of single carrier than LTE, e.g. a level of 100 MHz, comparing with a maximum 20 MHz in LTE, which imply there may be some different design consideration considering such huge different.

Figure 16:
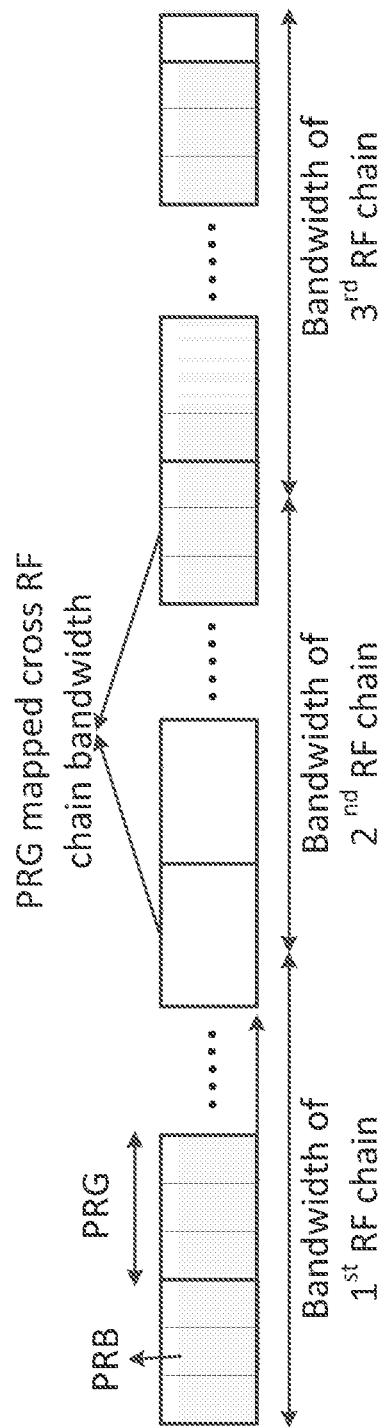
FIG. 16 is a diagram according to one exemplary embodiment.

One of the key considerations is whether a single baseband (channel) bandwidth or a single RF bandwidth can cover a single carrier. Many aspects can be considered, such as complexity (e.g. FFT size, sampling rate, PA linearity), or total power, which would result in a different combinations of possible implementation. An example of different options to cover a wider bandwidth with a smaller bandwidth of a component is given in FIG. 16 (as illustrated in 3GPP R4-1610920).

Some relevant discussion took placed in 3GPP:
Agreements:
At least for Phase 1, study mechanisms to support operation over e.g. around 1 GHz contiguous spectrum from both NW and UE perspectives including the maximum single carrier bandwidth of at least 80 MHz
Carrier Aggregation/Dual Connectivity (Multi-carrier approach)
Details are FFS
FFS: non-contiguous spectrum case
Single carrier operation
Details are FFS
Maximum channel bandwidth continues to be studied in RAN1/4
Maximum bandwidth supported by some UE capabilities or categories may be less than channel bandwidth of serving single carrier
Note that some UE capabilities or categories may support channel bandwidth of serving single carrier
Send an LS to ask RAN4 to study the feasibilities of mechanisms above from both NW and UE perspectives
Agreements:
Study at least the following aspects for NR carrier aggregation/dual connectivity
Intra-TRP and inter-TRP with ideal and non-ideal backhaul scenarios
Number of carriers
The need for certain channels, e.g. downlink control channel, uplink control channel or PBCH for some carriers Cross-carrier scheduling and joint UCI feedback, e.g. HARQ-ACK feedback
TB mapping, i.e., per carrier or across carriers
Carrier on/off switching mechanism
Power control
Different numerologies between different/same carrier(s) for a given UE
FFS: whether/if different numerologies are multiplexed on one carrier for one UE is called carrier aggregation/dual connectivity Agreements:
NR should provide support for carrier aggregation, including different carriers having same or different numerologies.

Agreements:
For phase 1, carrier aggregation/dual connectivity operation within NR carriers over e.g. around 1 GHz contiguous and non-contiguous spectrum from both NW and UE perspectives is supported
[4-32] should be assumed for further study of the maximum number of NR carriers
RAN1 will try to decide the exact number in this week
Cross-carrier scheduling and joint UCI feedback are supported
Per-carrier TB mapping is supported
FFS TB mapping across multiple carriers Agreements:
From RAN1 specification perspective, maximum channel bandwidth per NR carrier is [400, 800, 1000] MHz in Rel-15
RAN1 recommends RAN4 to consider at least 100 MHz maximum channel bandwidth per NR carrier in Rel-15 considering carrier frequency bands
RAN1 asks the feasibility of at least followings
For sub-6 GHz, 100 MHz is considered and for above-6 GHz, wider than 100 MHz is considered
Other cases can be considered by RAN4, e.g., 40 MHz, 200 MHz
Note that RAN1 will specify all details for channel bandwidth at least up to 100 MHz per NR carrier in Rel-15
Also note that RAN1 will consider scalable design(s) for up to maximum channel bandwidth per NR carrier
From RAN1 specification perspective, the maximum number of NR carriers for CA and DC is [8, 16, 32]
The maximum FFT size is not larger than [8192, 4096, 2048]

Agreements:
If it is decided that maximum CC BW is greater than or equal to 400 MHz and smaller than or equal to 1000 MHz
The maximum number of CCs in any aggregation is [either 8 or 16]
If it is decided that the maximum CC BW is <=100 MHz
The maximum number of CCs in any aggregation could be [either 16 or 32]
If it is decided that the maximum CC BW is greater than 100 MHz and smaller than 400 MHz
The maximum number of CCs is FFS Agreements:
From RAN1 specification perspective, maximum channel bandwidth per NR carrier is 400 MHz in Rel-15
Note: final decision on the value is up to RAN4

From RAN1 specification perspective, at least for single numerology case, candidates of the maximum number of subcarriers per NR carrier is 3300 or 6600 in Rel-15
FFS: For mixed numerology case, the above applies to the lowest subcarrier spacing
Note: final value for a given channel BW is up to RAN4 decision
From RAN1 specification perspective, the maximum number of NR carriers for CA and DC is 16
Note that 32 is considered from RAN2 specification perspective
The number of NR CCs in any aggregation is independently configured for downlink and uplink
NR channel designs should consider potential future extension of the above parameters in later releases, allowing Rel-15 UE to have access to NR network on the same frequency band in later releases Agreements:
Prepare draft LS in R1-1703919—Peter (Qualcomm) to RAN4 to inform that RAN1 is discussing following alternatives for a wider BW CC, i.e., CC BW greater than X (e.g., 100 MHz),
A) UE is configured with one wideband carrier while the UE utilizes multiple Rx/Tx chains (Case 3)
B) A gNB can operate simultaneously as wideband CC for some UEs (UEs with single chain) and as a set of intra-band contiguous CCs with CA for other UEs (UEs with multiple chains)
FFS: Potential impact on design for the wide BW signal/channels
Note: The support of multiple Rx/Tx chains in the gNB within one wideband CC is not addressed in above discussion Agreements:
Resource allocation for data transmission for a UE not capable of supporting the carrier bandwidth can be derived based on a two-step frequency-domain assignment process
$1^{st}$ step: indication of a bandwidth part
$2^{nd}$ step: indication of the PRBs within the bandwidth part
FFS definitions of bandwidth part
FFS signaling details
FFS the case of a UE capable of supporting the carrier bandwidth In the following, we provide our view on the details of two step resource allocation for data channel in NR.

Agreements:
The duration of a data transmission in a data channel can be semi-statically configured and/or dynamically indicated in the PDCCH scheduling the data transmission
FFS: the starting/ending position of the data transmission
FFS: the indicated duration is the number of symbols
FFS: the indicated duration is the number of slots
FFS: the indicated duration is the numbers of symbols+ slots
FFS: in case cross-slot scheduling is used
FFS: in case slot aggregation is used
FFS: rate-matching details
FFS: whether/how to specify UE behavior when the duration of a data transmission in a data channel for the UE is unknown Agreement:
For single-carrier operation,
UE is not required to receive any DL signals outside a frequency range A which is configured to the UE The interruption time needed for frequency range change from frequency range A to a frequency range B is TBD Frequency ranges A & B may be different in BW and center frequency in a single carrier operation Working Assumption:

One or multiple bandwidth part configurations for each component carrier can be semi-statically signalled to a UE A bandwidth part consists of a group of contiguous PRBs Reserved resources can be configured within the bandwidth part The bandwidth of a bandwidth part equals to or is smaller than the maximal bandwidth capability supported by a UE The bandwidth of a bandwidth part is at least as large as the SS block bandwidth The bandwidth part may or may not contain the SS block Configuration of a bandwidth part may include the following properties Numerology Frequency location (e.g. center frequency)

Bandwidth (e.g. number of PRBs)

Note that it is for RRC connected mode UE

FFS how to indicate to the UE which bandwidth part configuration (if multiple) should be assumed for resource allocation at a given time FFS neighbour cell RR Agreement:

Support the following:

A gNB can operate simultaneously as wideband CC for some UEs and as a set of intra-band contiguous CCs with CA for other UEs RAN1 believes that it is beneficial to allow zero guardband between CCs within wideband CC and asks RAN4 to take it into account when discussing channel raster If there are scenarios where guard band is considered necessary, strive to minimize the number of subcarriers for guard-band between CCs within wideband CC It is RAN1 understanding that guard band might be supported by RAN4

Allow single or multiple Sync signal locations in wideband CC

Consider further impact on design for:

Reference signals

Resource Block Group design and CSI subbands

If PRG is applied on a cell with wider bandwidth supported by multiple RF chains, as PRG is counted contiguously across a whole cell, it is possible that a PRG would map cross different RF bandwidths, e.g. some resource block(s) within a PRG is processed by a RF chain while other resource block within the PRG is processed by another RF chain. As different RF chains would induce non-continuity of phase and amplitude from each other, demodulating resource blocks belonging to different RF chains jointly would harm accuracy of channel estimation as amplitude and phase error would be induced by the non-continuity.

Figure 17:
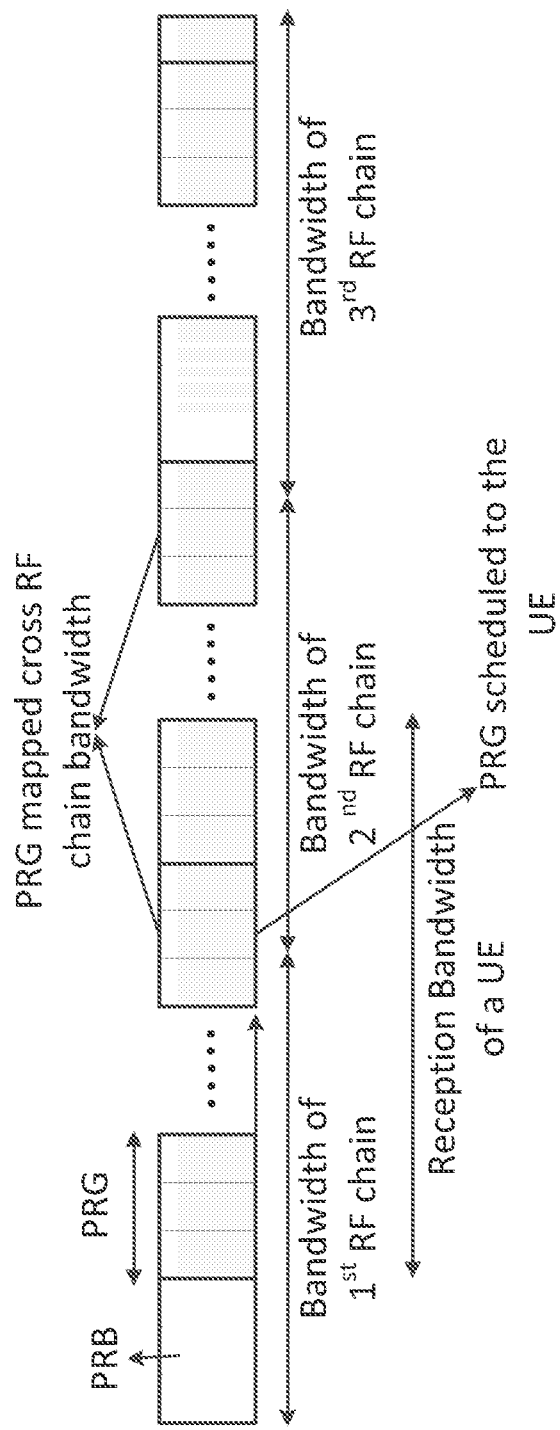
FIG. 17 is a diagram according to one exemplary embodiment.

In general, the benefit of PRB bundling would then harm the quality/performance of reception in the PRG cross RF (Radio Frequency) boundary. In other words, if a UE is scheduled a PRG mapped cross RF chain boundary and the UE assume all reference signal within the PRG can be used to derive a channel for demodulation of whole PRG, the reception would be degraded as reference signal of one PRB in a PRG in one RF chain cannot be used to obtain channel of another PRB in the PRG in another RF chain. An example of this issue is given in FIGS. 16 and 17.

In the example, a total of 400 PRBs in one carrier is assumed and there are three RF chains used to cover the carrier, e.g. in gNB side. 1st RF chain and 2nd RF chain could cover 133 resource blocks and 3rd RF chain could cover 134 resource blocks. Following current PRG design, starting from low frequency to high frequency, size of PRG would be in non-increasing order. That is, 3 PRB would be grouped into a PRG in this example and the first PRG to 133th PRG would each comprise 3 PRB and 134th PRG would comprise 1 PRB. It can be observed that following this design, first PRB of 45th PRG would be covered by 1st RF chain and the rest two PRBs of 45th PRG would be covered by 2nd RF chain. Similarly, PRBs in 89th PRG would be covered by 2nd RF chain and 3rd RF chain. If 45th PRG is within reception bandwidth of a UE and PRBs scheduled to the UE within 45th PRG belongs to different RF chain, deriving channel estimation across PRBs within 45th PRG would be problematic. Note that in this example, 3 PRB per PRG is assumed, while if a larger size of PRG is used, the problem would be even worse, e.g, for 6 or 10 PRBs per PRG.

Figure 18:
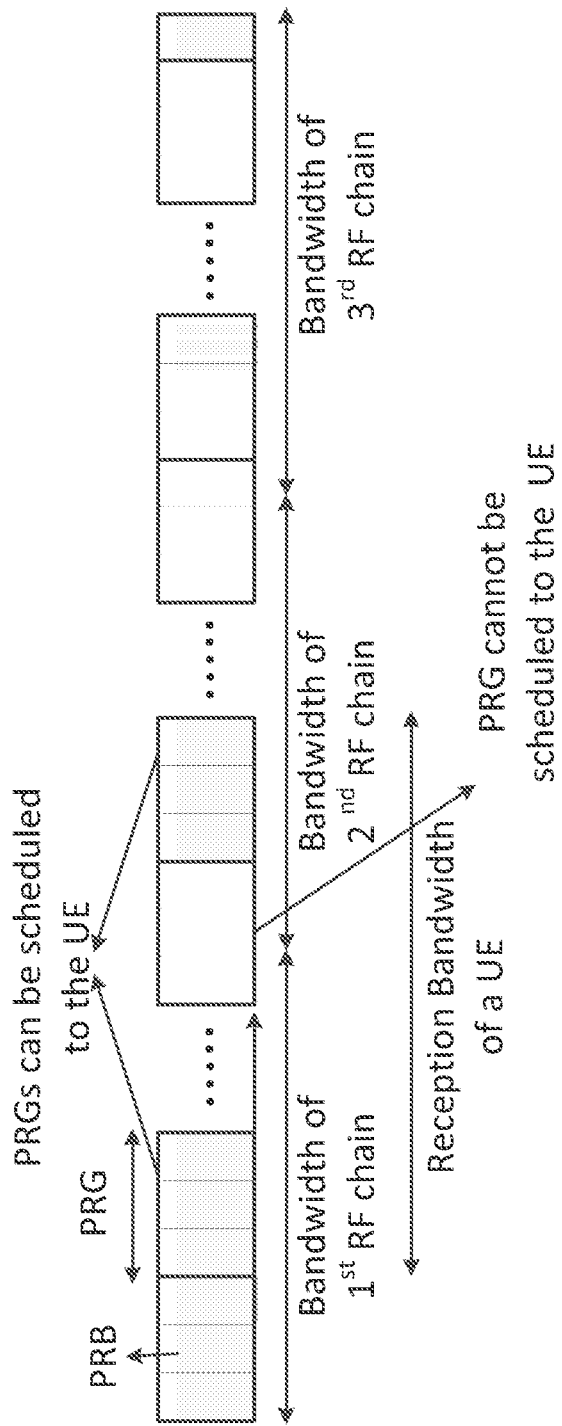
FIG. 18 is a diagram according to one exemplary embodiment.

A first general concept of this invention, according to one exemplary embodiment, is that gNB (gNodeB) avoids scheduling a PRG which maps cross RF bandwidth boundary at least for UE operating with PRB bundling. gNB can schedule PRG which maps cross RF bandwidth boundary to UE not operating with PRB bundling. An example is given in FIG. 18.

Figure 19:
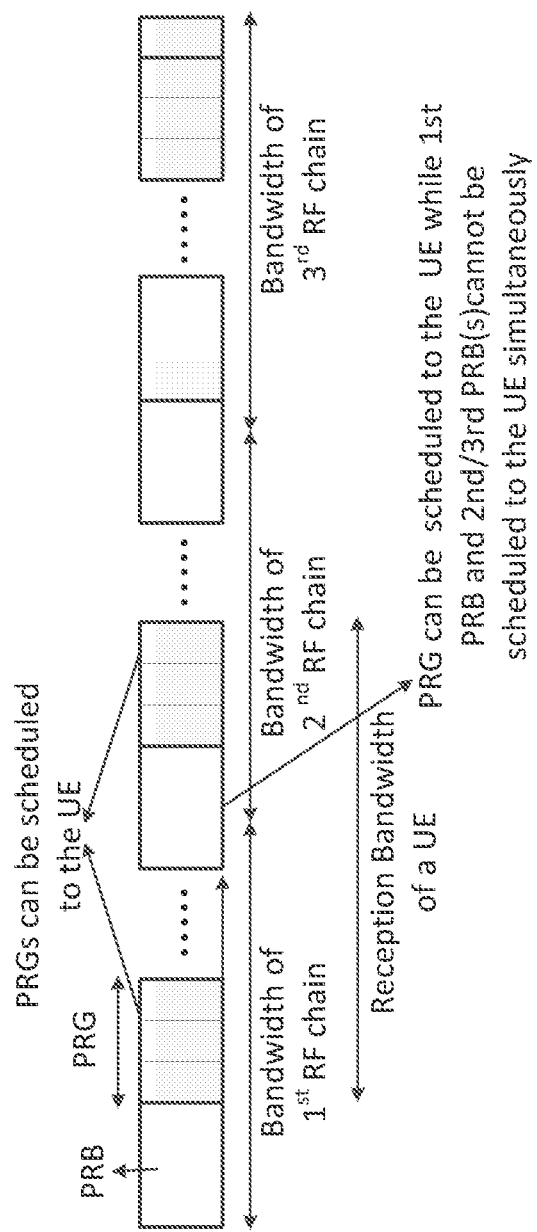
FIG. 19 is a diagram according to one exemplary embodiment.

Similarly while alternatively, gNB can schedule a PRG which maps cross RF bandwidth boundary for UE operating with PRB bundling, while the scheduled PRB within the PRG belong to a single RF chain, e.g. either 1st PRB of 45th PRG belonging to 1st RF chain or 2nd 3rd PRB of 45th PRG belonging to 2nd RF chain in the example. An example is given in FIG. 19.

Figure 20:
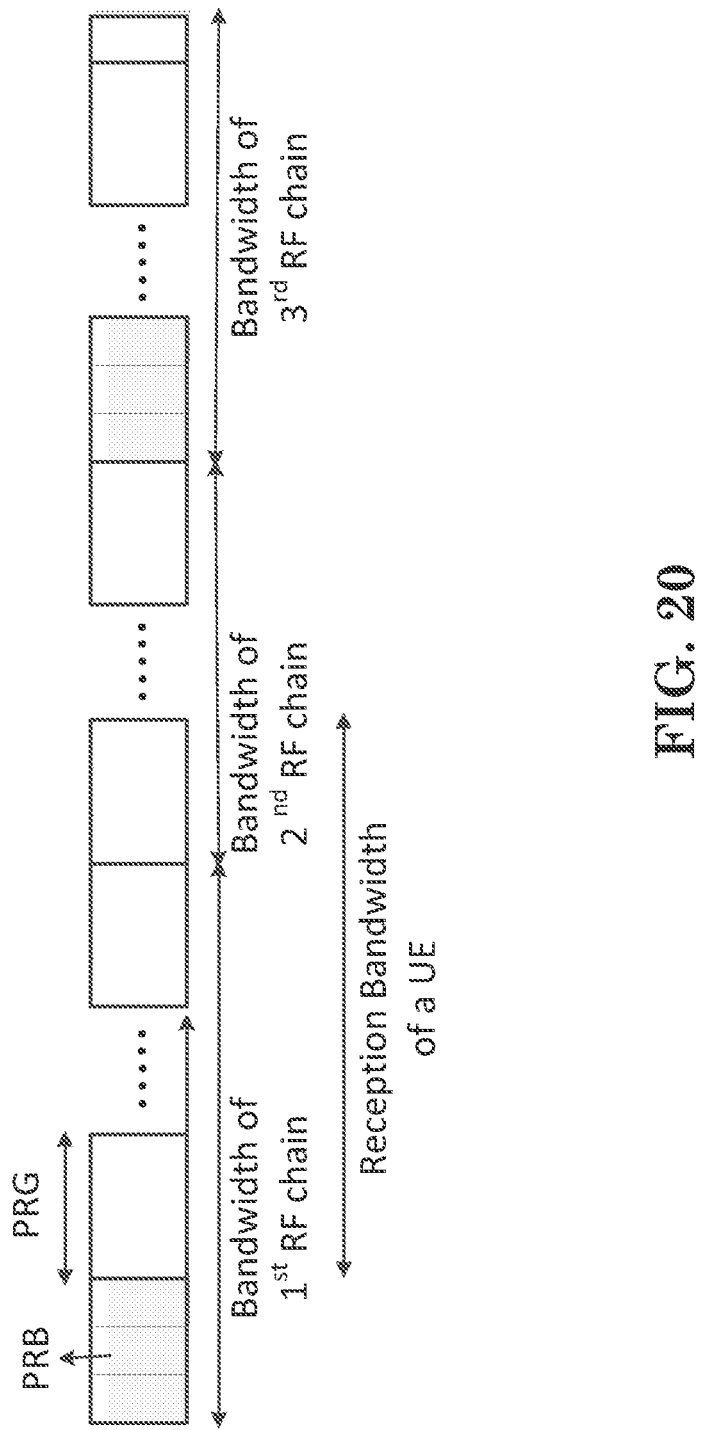
FIG. 20 is a diagram according to one exemplary embodiment.

A second general concept would be that gNB avoids PRG mapping cross RF bandwidth boundary. For example, one RF bandwidth consists of integer number of PRGs. Taking example in FIG. 16 as an example, bandwidth of 1st RF chain would be 135 PRBs, i.e. 45 PRGs. Bandwidth of 2nd RF bandwidth can be 135 or 132 PRBs, i.e. 45 or 44 PRGs. The rest PRBs/PRG are covered by 3rd RF bandwidth. An example is given in FIG. 20.

Figure 21:
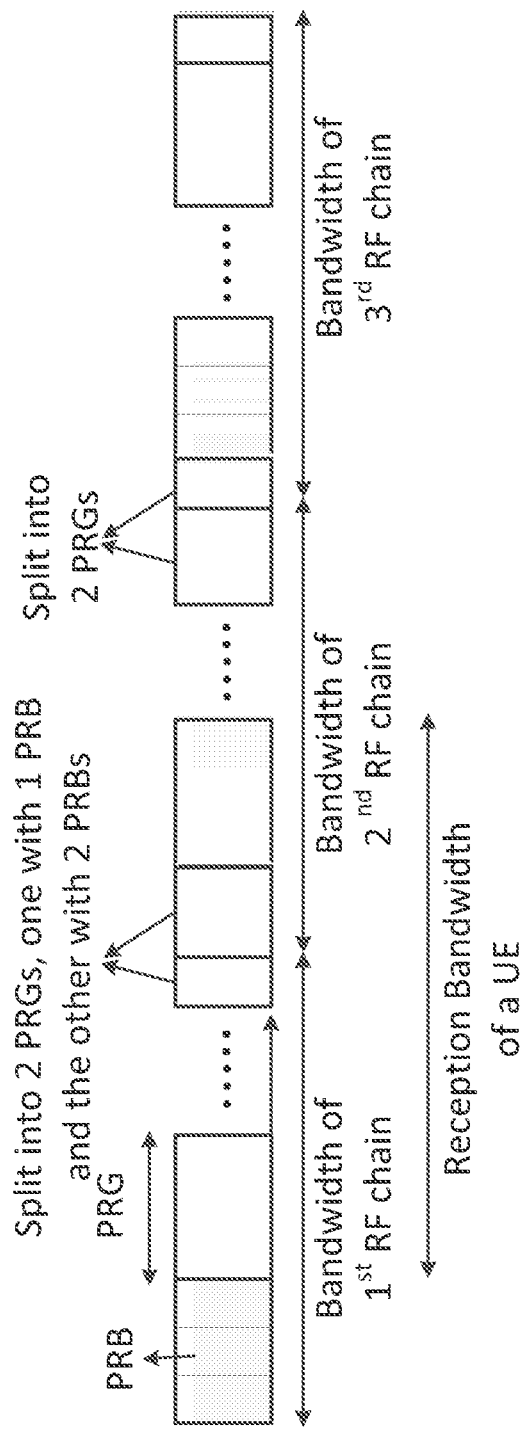
FIG. 21 is a diagram according to one exemplary embodiment.
Figure 22:
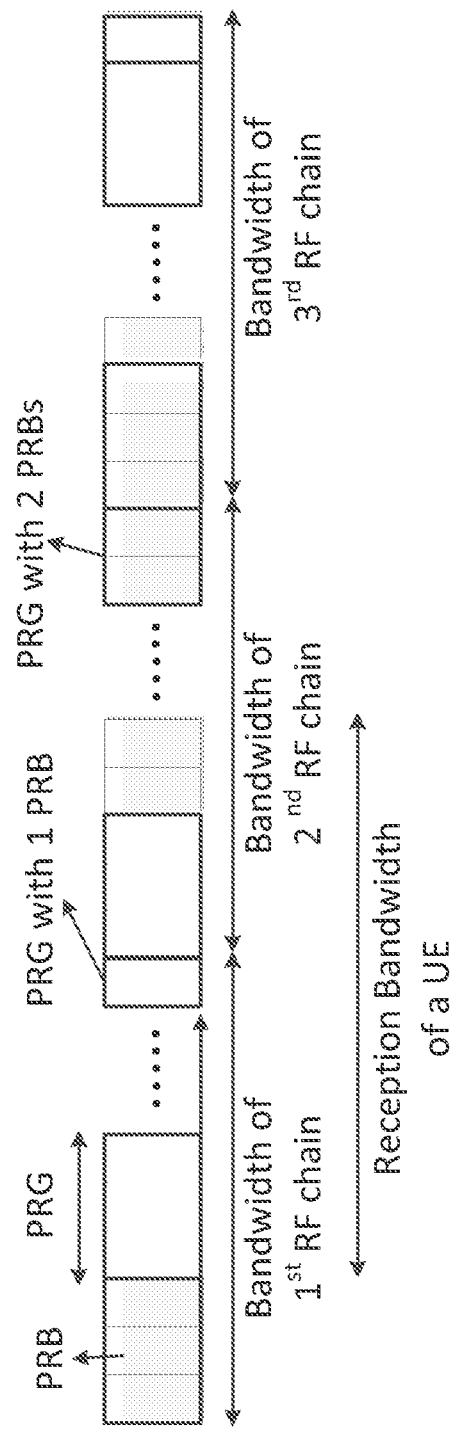
FIG. 22 is a diagram according to one exemplary embodiment.

A third general concept is the size of PRG does not follow non-increasing order in frequency domain across the whole carrier bandwidth. For example, within a bandwidth, e.g. RF bandwidth, the size of PRG follows non-increasing order in frequency domain, while across two bandwidths, e.g. cross boundary of two RF bandwidths, the size of PRG can be increased in frequency domain. For example, 130th-132th PRB in FIG. 16 can be configured as 44th PRG (with size of 3 PRBs), 133th PRB can be configured as 45th PRG (with size of 1 PRB) and 134th PRB and 135th PRB can be configured as 46th PRG (with size of 2 PRBs), 136th-138th PRB can be configured as 47th PRG (with size of 3 PRBs). Examples are given in FIGS. 21 and 22.

Figure 23:
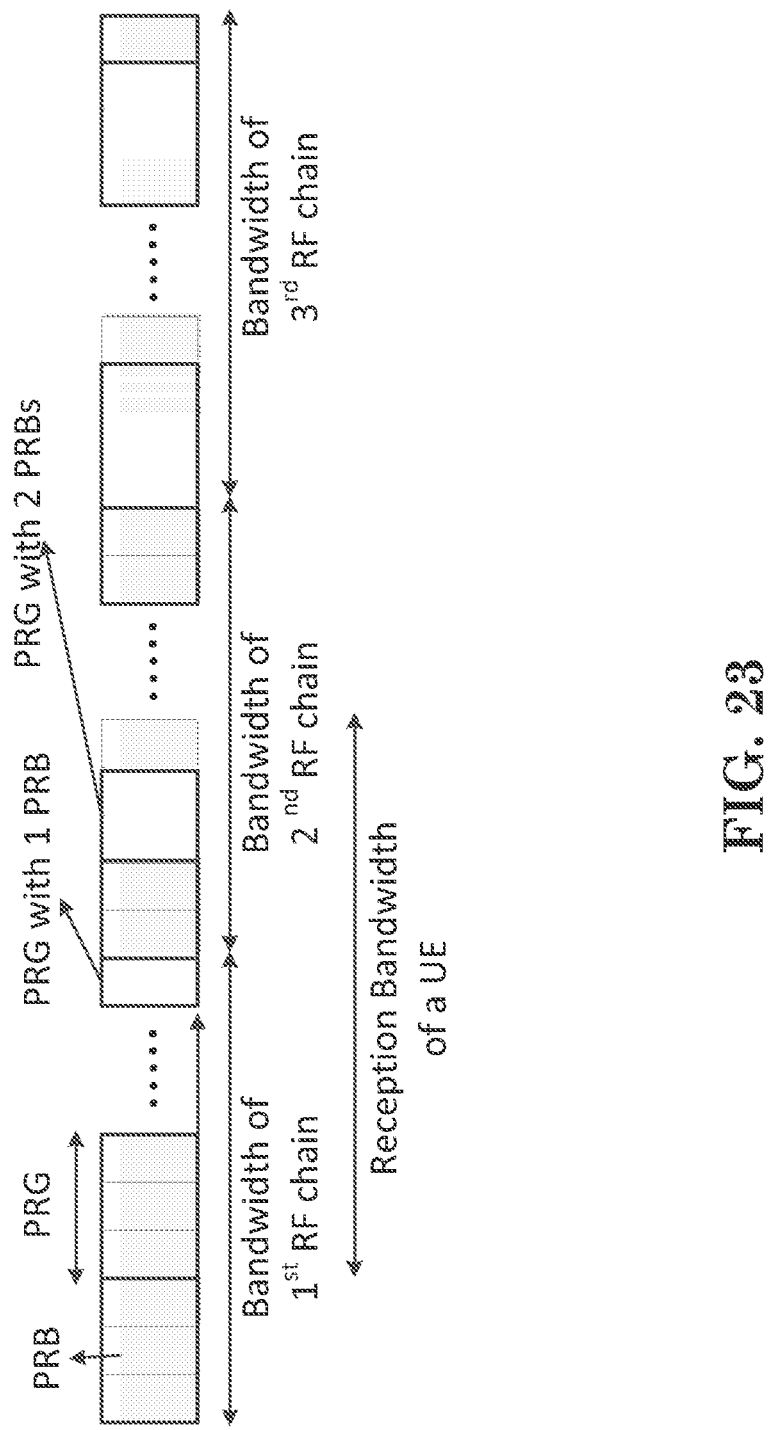
FIG. 23 is a diagram according to one exemplary embodiment.

A fourth general concept is the PRB to PRG mapping is done per bandwidth portion, e.g. per RF bandwidth. For example, a carrier/cell can be divided into several bandwidth portions, and each bandwidth portion comprises a number of PRB(s). Note that different bandwidth portions may comprise different numbers of PRB(s). A bandwidth portion would be partitioned by a PRG size. At least one PRG with size less than PRG size for the bandwidth portion exists if PRG size cannot be equally divided by PRG size for the bandwidth portion. Note that PRG size for different bandwidth portion may be different. PRG size for a given bandwidth portion can be derived according to a predefined rule, e.g. according to a bandwidth of the given bandwidth portion. An example is given in FIG. 23.

Figure 24:
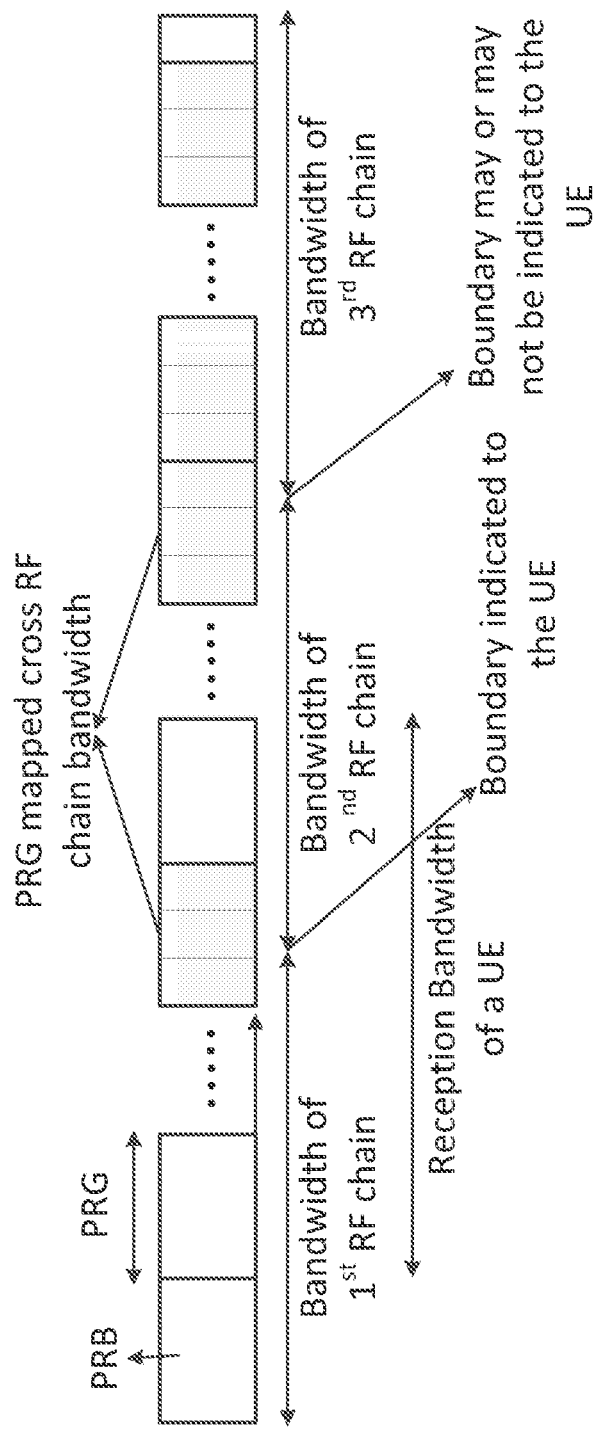
FIG. 24 is a diagram according to one exemplary embodiment.

A fifth general concept is that gNB indicates boundary(s), e.g. RF bandwidth boundary and/or PRB bundling boundary, of a carrier to a UE. The boundary is related to PRB bundling operation. For example, when UE performs channel estimation according to PRB bundling, UE would derive joint channel estimation for PRG which does not map across the boundary. UE would not derive joint channel estimation for PRG across the boundary(s). UE would derive separate/different channel estimations for PRB(s) on different side of the boundary(s). An example is given in FIG. 24.

Figure 25:
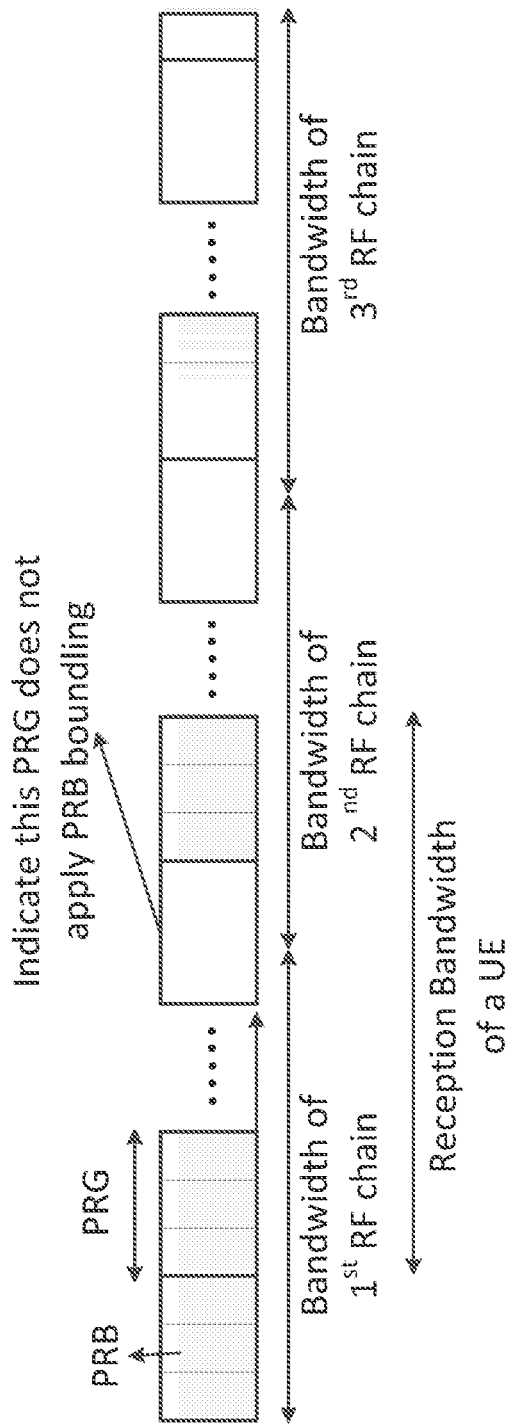
FIG. 25 is a diagram according to one exemplary embodiment.

A sixth general concept is that gNB can control whether PRB bundling is applied/turn-on/activated by the UE or not, e.g. gNB can decide to turn on or turn off the PRB bundling functionality in the UE side, an example of the decision is whether a PRG schedule for the UE across RF bandwidth boundary or not. The scale of turn-on or turn-off can be per TTI, subframe, slot, or mini-slot basis in the time domain, e.g. gNB indicate for each TTI, subframe, slot, or mini-slot, the functionality is turn-on or not (there may be default decision if there is no indication). The scale of turn-on or turn-off can be per PRB, PRG, subband, or bandwidth portion basis in the frequency domain, e.g. gNB indicates for each PRB, PRG, subband, or bandwidth portion, the functionality is turn-on or not. In one embodiment, there may be default decision if there is no indication. The scale can jointly consider time domain and frequency domain. The indication can be carried on a control channel used to schedule a data channel (in that TTI, subframe, slot, or mini-slot. An example is given in FIG. 25.

Figure 26:
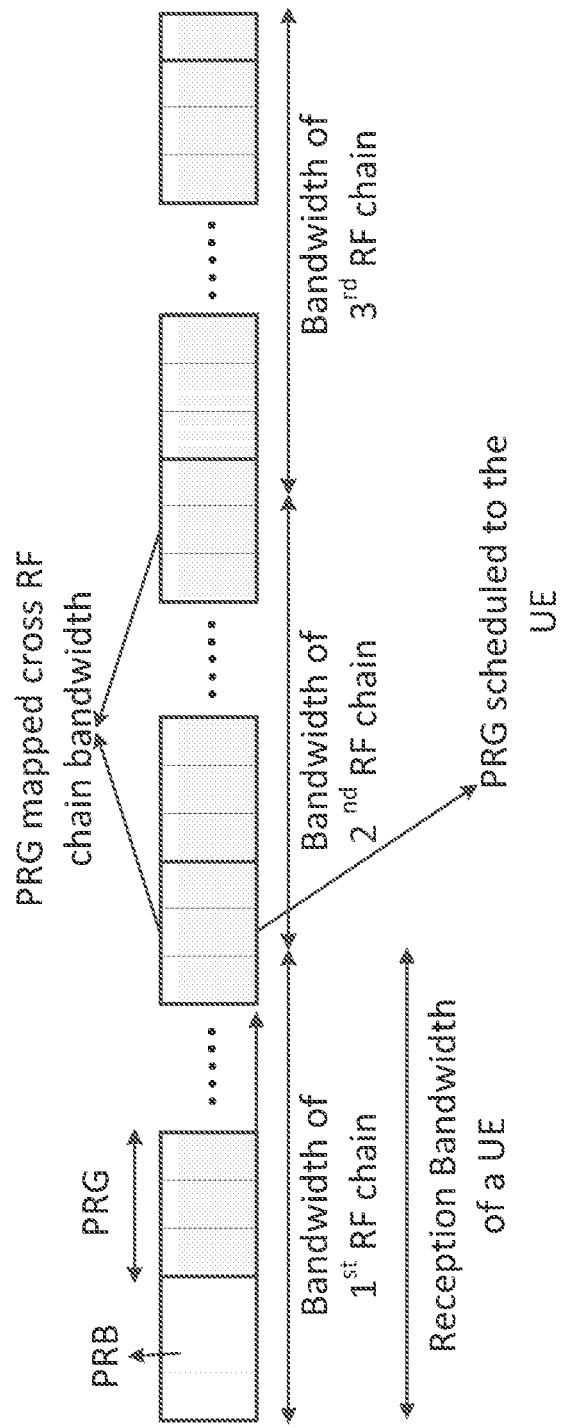
FIG. 26 is a diagram according to one exemplary embodiment.
Figure 27:
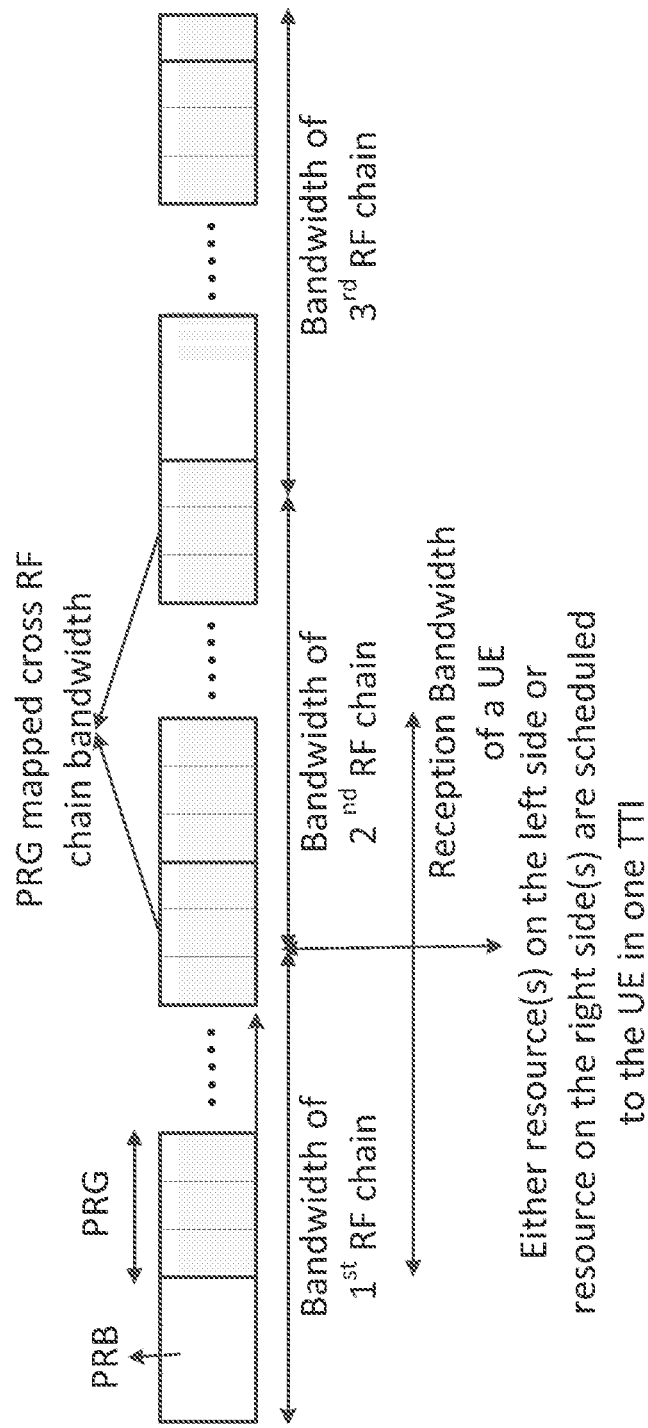
FIG. 27 is a diagram according to one exemplary embodiment.

A seventh general concept is that UE reception bandwidth, e.g. bandwidth part, does not map across RF bandwidth boundary of a base station. In one embodiment, a UE is capable of receiving a bandwidth larger than a bandwidth of a RF chain of a gNB. Alternatively, UE reception bandwidth, e.g. bandwidth part, can map across RF bandwidth boundary of a base station while UE cannot receive a scheduling schedule a data channel whose resource map across RF bandwidth boundary of a base station. Examples are given in FIGS. 26 and 27.

Throughout this application, base station, TRP, cell, gNB, and carrier could be used interchangeably. Furthermore, a base station could use a plurality of RF chains to transmit a carrier and each RF chain is used to transmit channel or signal associated with a portion of bandwidth of the carrier.

Throughout the application, a UE could use a single RF chains to receive a carrier of a base station (or a portion of a carrier if a maximum bandwidth supported by the UE is less than bandwidth of the carrier). Alternatively, a UE could use a plurality of RF chains to receive a carrier or a portion of a carrier of a base station and each RF chain is used to receive channel or signal associated with a portion of bandwidth of the carrier or the portion of the carrier.

In one embodiment, a gNB could decide whether or how to schedule resource blocks within a PRG to a UE according to whether PRB bundling is applied by the UE. In one embodiment, the PRG could map cross a RF bandwidth boundary of the gNB.

In one embodiment, the gNB does not schedule resource block(s) within the PRG to UE(s) operating with PRB bundling. Furthermore, the gNB could schedule resource block(s) within the PRG to UE(s) not operating with PRB bundling. Alternatively, the gNB could schedule resource block(s) within the PRG to UE(s) operating with PRB bundling wherein the scheduled resource block(s) within the PRG are transmitted by a same RF chain of the gNB. In one embodiment, a reception bandwidth of a UE could map across the RF bandwidth boundary. In one embodiment, UE could be scheduled with a data channel which maps across the RF bandwidth boundary.

In another embodiment, a gNB or UE could group resource blocks into PRG wherein all resource blocks within every PRG within a carrier bandwidth would be transmitted by a single RF chain. Furthermore, different PRG may be transmitted with different RF chain. In addition, a size of a bandwidth of a RF chain can be equally divided by a size of PRG corresponding to the bandwidth of the RF chain. Both sizes could be expressed in a unit of PRB. In one embodiment, there is no PRGs mapping across a RF bandwidth boundary of a gNB. Furthermore, sizes of bandwidths of different RF chains could be different. In addition, sizes of bandwidths of PRG corresponding to bandwidths of different RF chains could be different.

In another embodiment, a gNB or UE could group resource blocks into PRG wherein sizes of PRG do not follow non-increasing order in frequency domain across a carrier bandwidth. Furthermore, sizes of PRG could follow non-increasing order in frequency domain within a first set of PRGs in the carrier bandwidth, and sizes of PRG could follow increasing order in frequency domain within a second set of PRGs within the carrier bandwidth.

In one embodiment, the gNB could configure a plurality of bandwidth portions which partition a whole carrier bandwidth. Furthermore, the bandwidth portions could be configured by a dedicated signaling to a UE. In addition, the bandwidth portions could be configured by a broadcast signaling.

Size and location of bandwidth portions could be fixed (or pre-known) to UE or gNB. Also, sizes of PRG could follow non-increasing order in frequency domain within a bandwidth portion. In addition, sizes of PRG could follow increasing order from PRG within a first bandwidth portion to a PRG within a second bandwidth portion. Sizes and/or locations of PRG could also follow a predefined rule. More specifically, sizes and/or locations of PRG could be determined according to a bandwidth of a bandwidth portion. Alternatively, sizes and/or locations of PRG could be configured to UE with a dedicated signal or a broadcast signal. In addition, sizes and/or locations of PRG for different bandwidth portions can be different. For example, a first bandwidth portion comprises PRGs (mostly) with size of 2 PRBs and a second bandwidth portion comprises PRGs with (mostly) size of 3 PRBs. "Mostly" could mean PRG with even smaller size may exist due to PRG size not equally dividing the first bandwidth portion or the second bandwidth portion. A reception bandwidth of a UE could map across the RF bandwidth boundary. Furthermore, UE could be scheduled with data a data channel which maps across the RF bandwidth boundary.

In another embodiment, a gNB could indicate boundary (s), e.g. RF bandwidth boundary, PRB bundling boundary, of a carrier to a UE. Alternatively, boundary(s) (e.g. RF bandwidth boundary, PRB bundling boundary) of a carrier could be fixed or pre-known to a gNB or a UE. The boundary is related to PRB bundling operation.

In one embodiment, a gNB does not transmit PRBs with a same manner across the boundary(s). The PRBs could belong to a same PRG. In one embodiment, a UE does not receive PRBs with a same manner across the boundary(s).

The PRBs could belong to a same PRG across the boundary. In one embodiment, receiving PRBs with a same manner means deriving channel estimation jointly for the PRB. The UE could receive PRBs with a same manner wherein the PRBs belong to a same PRG which does not map across the boundary(s). For example, when UE performs channel estimation according to PRB bundling, UE would derive joint channel estimation for PRG which does not map across the boundary. UE would not derive joint channel estimation for PRG across the boundary(s). UE would derive separate/different channel estimations for PRB(s) on different side of the boundary(s).

In one embodiment, a gNB could indicate whether a functionality of PRB bundling is applied, activated, or turned-on or not to a UE. Furthermore, the indication may not be whether PMI/RI reporting is configured. In addition, the indication may not be a configured transmission mode of the UE. Furthermore, the functionality of PRB bundling could be configured for the UE. In addition, the UE could be configured with transmission mode supporting PRB bundling. In one embodiment, the indication could tell the UE which TTI, subframe, slot, or mini-slot the functionality of PRB bundling is applied, activated, or turned-on. The indication could tell the UE which TTI, subframe, slot, or mini-slot the functionality of PRB bundling is not applied, activated, or turned-on. The indication could tell the UE whether for a given TTI, subframe, slot, or mini-slot, the functionality of PRB bundling is applied, activated, or turned-on or not. The indication could tell that the UE in following TTIs, subframes, slots, or mini-slots, the functionality of PRB bundling is applied, activated, or turned-on. The indication could tell that the UE in following TTIs, subframes, slots, or mini-slots, the functionality of PRB bundling is not applied, activated, or turn-on.

There may be some delay between a reception of the indication and UE action of applied or not applied, activated or deactivated, turned-on or turned-off. The indication could tell the UE whether for a given PRB, PRG, subband, or bandwidth portion, the functionality of PRB bundling is applied, activated, or turned-on or not. More specifically or alternatively, the indication could tell the UE that the PRB, PRG, subband, or bandwidth portion where the functionality of PRB bundling is not applied, activated, or turned-on. More specifically or alternatively, the indication could be carried on a control channel. More specifically the control channel could be used to schedule a data channel to the UE. More specifically or alternatively, the indication could be applicable to TTI(s), subframe(s), slot(s), or mini-slot(s) that the control channel is associated with. More specifically or alternatively, the indication could be applicable to the TTI(s), subframe(s), slot(s), or mini-slot(s) that the data channel is associated with. More specifically or alternatively, the indication could be applicable to following TTI(s), subframe(s), slot(s), or mini-slot(s). More specifically or alternatively, the indication could be applicable to a certain number of TTI(s), subframe(s), slot(s), or mini-slot(s).

In another embodiment, reception bandwidth of a UE may not map across a boundary(s). The reception bandwidth could be a bandwidth part of the UE. The boundary(s) could be indicated by a gNB to the UE. The boundary(s) could be a RF boundary of a gNB.

In another embodiment, reception bandwidth of a UE can map across a boundary(s). In one embodiment, in a given TTIsubfrmae, slot, or mini-slot, a data channel scheduled to the UE may not map across the boundary(s). In one embodiment, the reception bandwidth could be a bandwidth part of the UE. In one embodiment, the boundary(s) could be indicated by a gNB to the UE. In one embodiment, the boundary(s) could be the RF boundary of a gNB.

Figure 28:
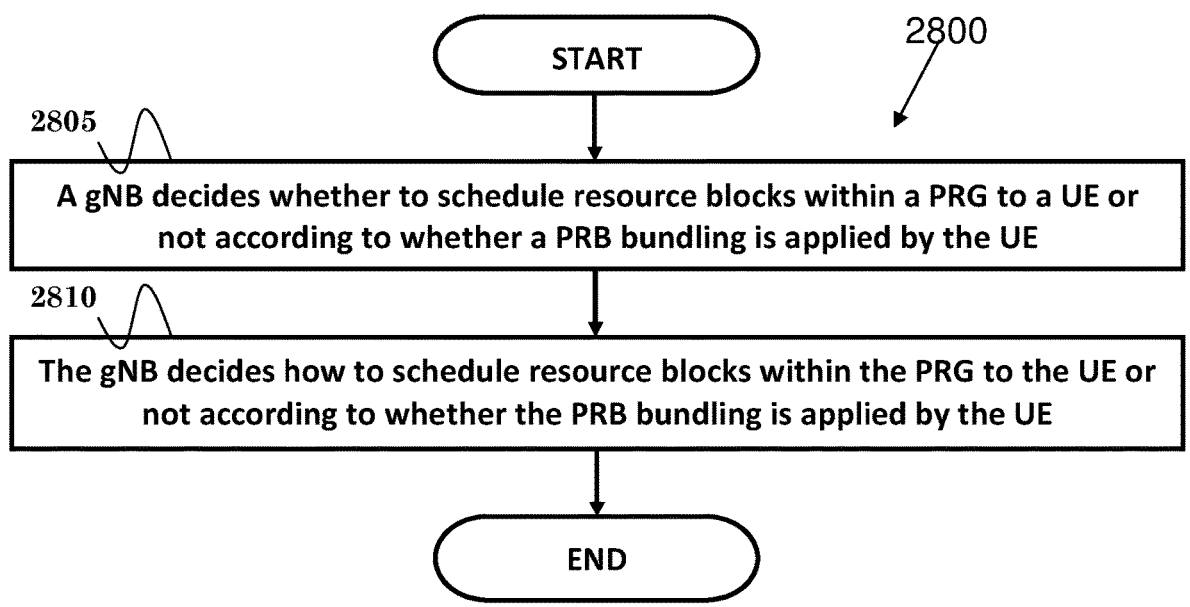
FIG. 28 is a flow chart according to one exemplary embodiment.

FIG. 28 is a flow chart 2800 according to one exemplary embodiment. In step 2805, a gNB decides whether to schedule resource blocks within a PRG to a UE or not according to whether a PRB bundling is applied by the UE. In one embodiment, the PRG could map cross a RF bandwidth boundary of the gNB.

In step 2810, the gNB decides how to schedule resource blocks within the PRG to the UE or not according to whether the PRB bundling is applied by the UE. In one embodiment, the gNB does not schedule resource block(s) within the PRG to the UE if the UE operates with PRB bundling. Alternatively, the gNB could schedule resource block(s) within the PRG to the UE if the UE does not operates with PRB bundling. Furthermore, the gNB could schedule resource block(s) within the PRG the UE if the UE operates with PRB bundling wherein the scheduled resource block(s) within the PRG are transmitted by a same RF chain of the gNB.

In one embodiment, a reception bandwidth of the UE can map across the RF bandwidth boundary. Furthermore, the UE can be scheduled with a data channel which maps across the RF bandwidth boundary.

Referring back to FIGS. 3 and 4, in one exemplary embodiment of a gNB, the device 300 includes a program code 312 stored in the memory 310. The CPU 308 could execute program code 312 to enable the gNB (i) to decide whether to schedule resource blocks within a PRG to a UE or not according to whether a PRB bundling is applied by the UE, and (ii) to decide how to schedule resource blocks within the PRG to the UE or not according to whether the PRB bundling is applied by the UE. Furthermore, the CPU 308 can execute the program code 312 to perform all of the above-described actions and steps or others described herein.

Figure 29:
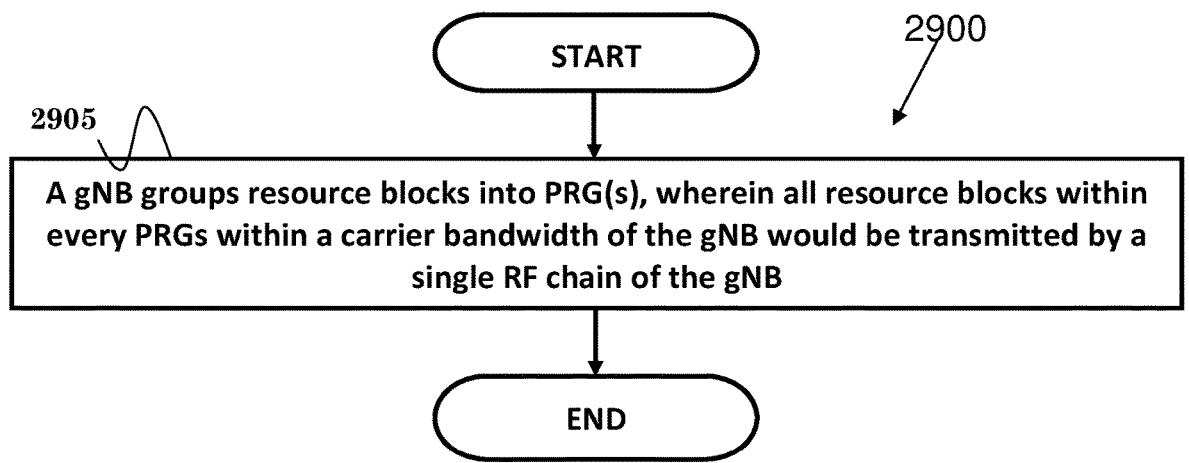
FIG. 29 is a flow chart according to one exemplary embodiment.

FIG. 29 is a flow chart 2900 according to one exemplary embodiment. In step 2905, a gNB groups resource blocks into PRG(s), wherein all resource blocks within every PRGs within a carrier bandwidth of the gNB would be transmitted by a single RF chain of the gNB.

Referring back to FIGS. 3 and 4, in one exemplary embodiment of a gNB, the device 300 includes a program code 312 stored in the memory 310. The CPU 308 could execute program code 312 to enable the gNB to group resource blocks into PRG(s), wherein all resource blocks within every PRGs within a carrier bandwidth of the gNB would be transmitted by a single RF chain of the gNB.

Figure 30:
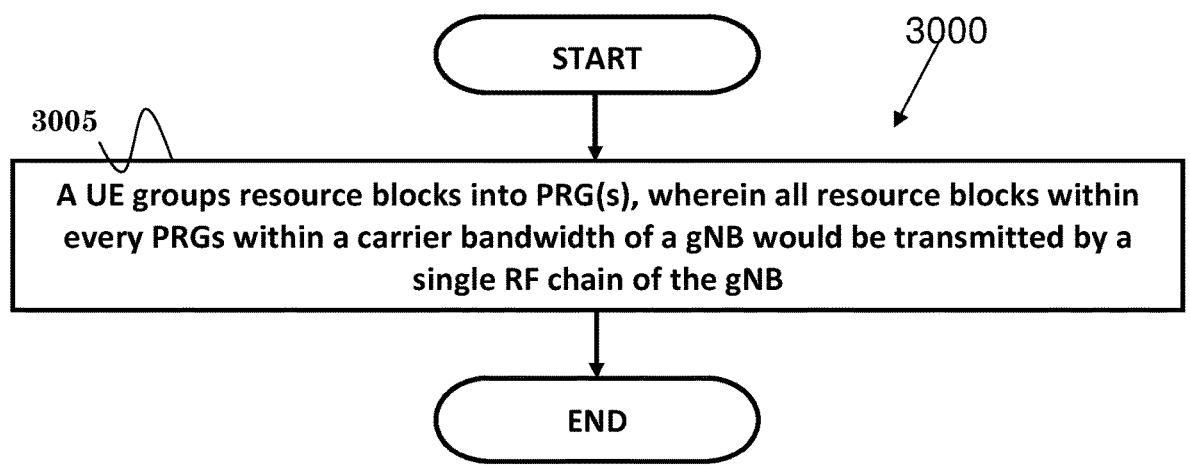
FIG. 30 is a flow chart according to one exemplary embodiment.

FIG. 30 is a flow chart 3000 according to one exemplary embodiment. In step 3005, a UE groups resource blocks into PRG(s), wherein all resource blocks within every PRGs within a carrier bandwidth of a gNB would be transmitted by a single RF chain of the gNB.

Referring back to FIGS. 3 and 4, in one exemplary embodiment of a UE, the device 300 includes a program code 312 stored in the memory 310. The CPU 308 could execute program code 312 to enable the UE to group resource blocks into PRG(s), wherein all resource blocks within every PRGs within a carrier bandwidth of a gNB would be transmitted by a single RF chain of the gNB. Furthermore, the CPU 308 can execute the program code 312 to perform all of the above-described actions and steps or others described herein.

In the context of the embodiments illustrated in FIGS. 29 and 30 and described above, in one embodiment, different PRGs could be transmitted with different RF chains. Furthermore, a size of a bandwidth of a RF chain could be equally divided by a size of PRG corresponding to the bandwidth of the RF chain. In addition, the size could be counted in a unit of PRB.

In one embodiment, there may be no PRG mapping across a RF bandwidth boundary of the gNB. Furthermore, sizes of bandwidths of different RF chains could be different. In addition, sizes of bandwidths of PRG corresponding to bandwidths of different RF chains could be different.

Figure 31:
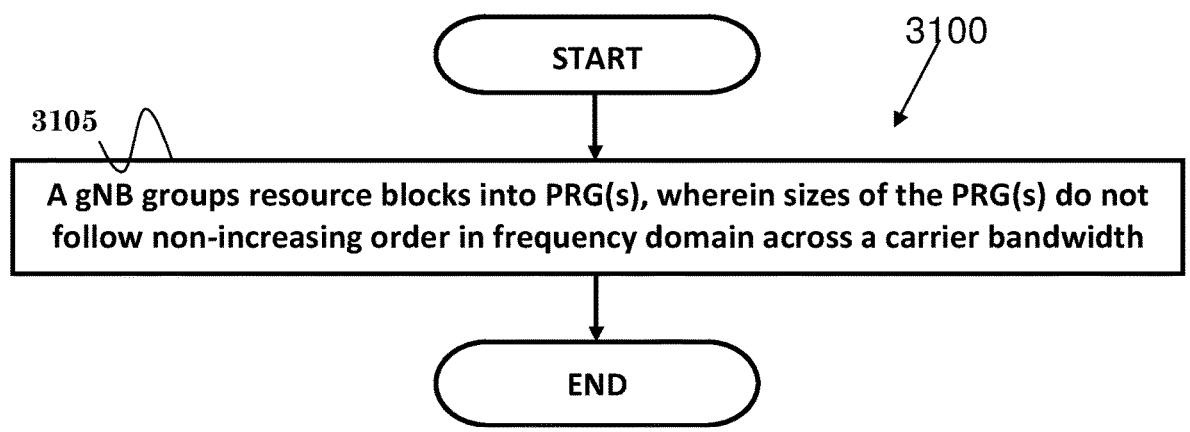
FIG. 31 is a flow chart according to one exemplary embodiment.

FIG. 31 is a flow chart 3100 according to one exemplary embodiment. In step 3105, a gNB groups resource blocks into PRG(s), wherein sizes of the PRG(s) do not follow non-increasing order in frequency domain across a carrier bandwidth.

Referring back to FIGS. 3 and 4, in one exemplary embodiment of a gNB, the device 300 includes a program code 312 stored in the memory 310. The CPU 308 could execute program code 312 to enable the gNB to group resource blocks into PRG(s), wherein sizes of the PRG(s) do not follow non-increasing order in frequency domain across a carrier bandwidth. Furthermore, the CPU 308 can execute the program code 312 to perform all of the above-described actions and steps or others described herein.

Figure 32:
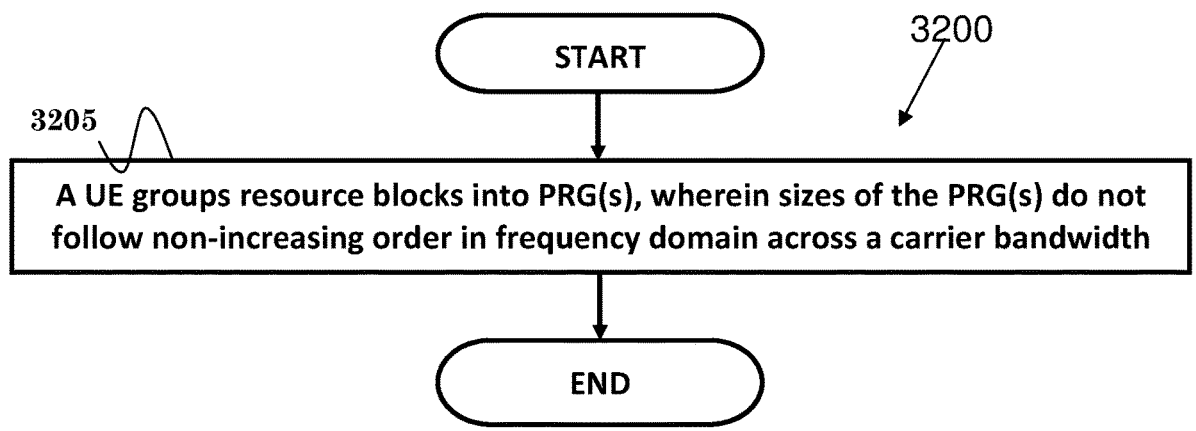
FIG. 32 is a flow chart according to one exemplary embodiment.

FIG. 32 is a flow chart 3200 according to one exemplary embodiment. In step 3205, a UE groups resource blocks into PRG(s), wherein sizes of the PRG(s) do not follow non-increasing order in frequency domain across a carrier bandwidth.

Referring back to FIGS. 3 and 4, in one exemplary embodiment of a UE, the device 300 includes a program code 312 stored in the memory 310. The CPU 308 could execute program code 312 to enable the UE to group resource blocks into PRG(s), wherein sizes of the PRG(s) do not follow non-increasing order in frequency domain across a carrier bandwidth.

In the context of the embodiments illustrated in FIGS. 31 and 32, in one embodiment, PRG sizes could follow non-increasing order in frequency domain within a first set of PRGs in the carrier bandwidth. PRG sizes could also follow increasing order in frequency domain within a second set of PRGs within the carrier bandwidth.

In one embodiment, the gNB could configure a plurality of bandwidth portions which partition a whole carrier bandwidth. The bandwidth portions could be configured by a dedicated signaling to a UE, or a broadcast signaling. Furthermore, size and/or location of bandwidth portions could be fixed/pre-known to the UE and/or the gNB. In addition, PRG sizes could follow a non-increasing order in frequency domain within a first bandwidth portion. PRG sizes of PRG could also follow increasing order from PRG within a first bandwidth portion to a PRG within a second bandwidth portion. Alternatively, sizes and/or locations of PRG could follow a predefined rule.

In one embodiment, sizes and/or locations of PRG could be determined according to a bandwidth of a bandwidth portion. Alternatively, sizes and/or locations of PRG could be configured to UE with a dedicated signal or a broadcast signal. Furthermore, sizes and/or locations of PRG for different bandwidth portions could be different.

In one embodiment, a reception bandwidth of a UE could map across the RF bandwidth boundary. Furthermore, a UE could be scheduled with data from a data channel which maps across the RF bandwidth boundary.

Figure 33:
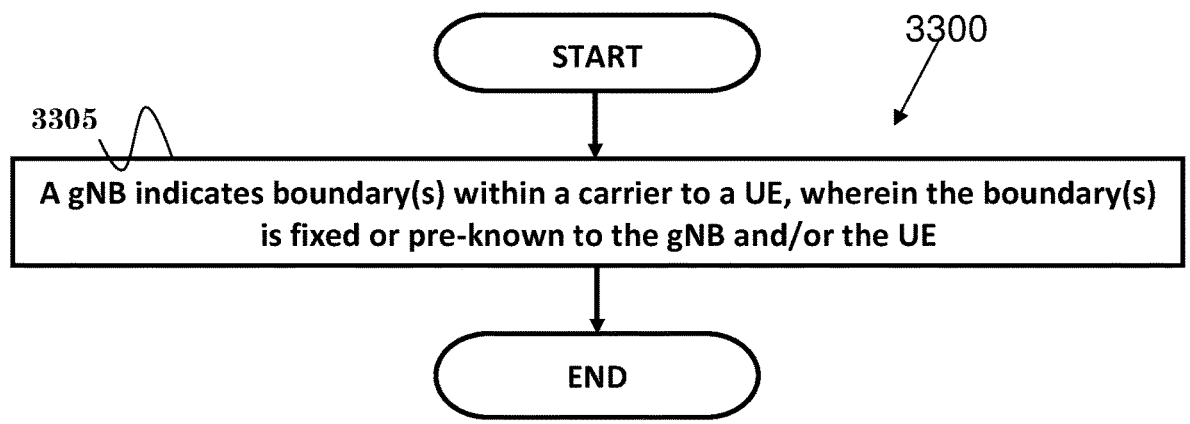
FIG. 33 is a flow chart according to one exemplary embodiment.

FIG. 33 is a flow chart 3300 according to one exemplary embodiment. In step 3305, a gNB indicates boundary(s) within a carrier to a UE, wherein the boundary(s) is fixed or pre-known to the gNB and/or the UE. In one embodiment, the boundary(s) could be a RF bandwidth boundary, or a PRB bundling boundary. Alternatively, the boundary(s) could be related to a PRB bundling operation.

In one embodiment, the gNB may not transmit PRBs with a same manner across the boundary(s). Furthermore, the PRBs could belong to a same PRG.

In one embodiment, the UE may not receive PRBs with a same manner across the boundary(s). Furthermore, the PRBs could belong to a same PRG across the boundary.

In one embodiment, the UE could receive PRBs with a same manner wherein the PRBs belong to a same PRG which does not map across the boundary(s). Furthermore, when the UE performs channel estimation according to PRB bundling, the UE could derive joint channel estimation for PRG which does not map across the boundary. In addition, the UE may not derive joint channel estimation for PRG across the boundary(s). Also, the UE could derive separate or different channel estimations for PRB(s) on different sides of the boundary(s).

Referring back to FIGS. 3 and 4, in one exemplary embodiment of a gNB, the device 300 includes a program code 312 stored in the memory 310. The CPU 308 could execute program code 312 to enable the gNB to indicate boundary(s) within a carrier to a UE, wherein the boundary(s) is fixed or pre-known to the gNB and/or the UE. Furthermore, the CPU 308 can execute the program code 312 to perform all of the above-described actions and steps or others described herein.

Figure 34:
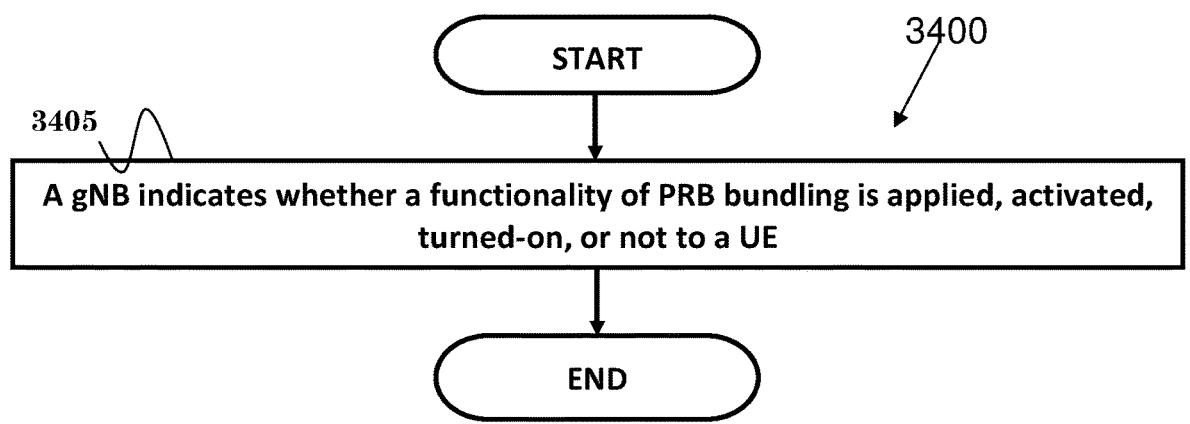
FIG. 34 is a flow chart according to one exemplary embodiment.

FIG. 34 is a flow chart 3400 according to one exemplary embodiment. In step 3405, a gNB indicates whether a functionality of PRB bundling is applied, activated, turned-on, or not to a UE.

In one embodiment, the indication could indicate whether or not PMI/RI reporting is configured. Furthermore, the indication is not a configured transmission mode of the UE.

In one embodiment, the functionality of PRB bundling could be configured for the UE. Furthermore, the UE could be configured with transmission mode supporting PRB bundling.

In one embodiment, the indication could inform the UE which TTI, subframe, slot, or mini-slot, the functionality of PRB bundling is applied, activated, or turned-on, or is not applied, activated, or turned-on. The indication could also inform the UE whether for a given TTI, subframe, slot, or mini-slot, the functionality of PRB bundling is applied, activated, turned-on, or not. Furthermore, the indication could inform the UE that in following TTIs, subframes, slots, or mini-slots, the functionality of PRB bundling is applied, activated, or turned-on. In addition, the indication could inform the UE that in following TTIs, subframes, slots, or mini-slots, the functionality of PRB bundling is not applied, activated, or turned-on.

In one embodiment, there may be some delay between a reception of the indication and the UE action of applied or not applied, activated or deactivated, or turned-on or turned-off.

In one embodiment, the indication could inform the UE whether for a given PRB, PRG, subband, or bandwidth portion, the functionality of PRB bundling is applied, activated, turned-on, or not. The indication could also inform the UE PRB, PRG, subband, or bandwidth portion where the functionality of PRB bundling is not applied, activated, or turned-on.

In one embodiment, the indication could be carried on a control channel. The control channel could be used to schedule a data channel to the UE.

In one embodiment, the indication could be applicable to TTI(s), subframe(s), slot(s), or mini-slot(s) the control channel associated with. The indication could also be applicable to TTI(s), subframe(s), slot(s), or mini-slot(s) the data channel associated with.

Referring back to FIGS. 3 and 4, in one exemplary embodiment of a gNB, the device 300 includes a program code 312 stored in the memory 310. The CPU 308 could execute program code 312 to enable the gNB to indicate whether a functionality of PRB bundling is applied, activated, turned-on, or not to a UE. Furthermore, the CPU 308 can execute the program code 312 to perform all of the above-described actions and steps or others described herein.

Figure 35:
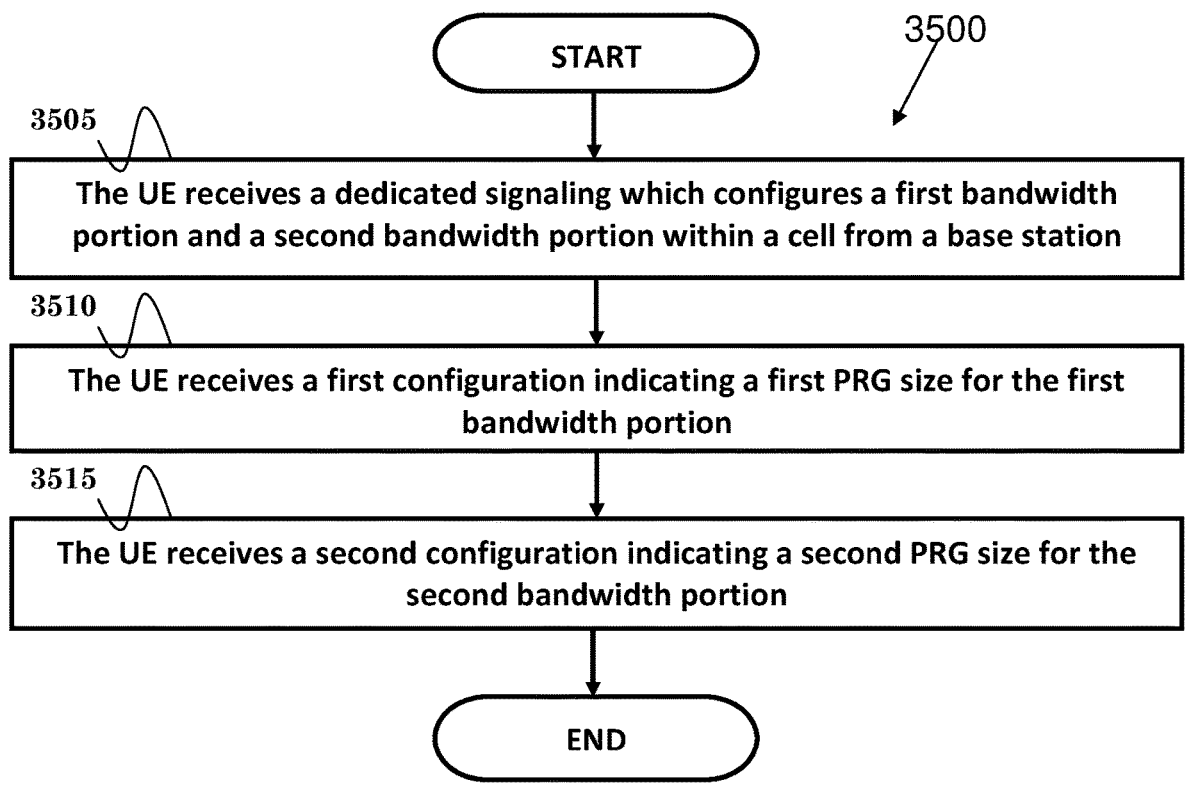
FIG. 35 is a flow chart according to one exemplary embodiment.

FIG. 35 is a flow chart 3500 according to one exemplary embodiment. In step 3505, the UE receives a dedicated signaling which configures a first bandwidth portion and a second bandwidth portion within a cell from a base station. In step 3510, the UE receives a first configuration indicating a first precoding resource group (PRG) size for the first bandwidth portion. In step 3515, the UE receives a second configuration indicating a second PRG size for the second bandwidth portion.

In one embodiment, the UE determines PRGs within the first bandwidth portion according to the first configuration, the UE determines PRGs within the second bandwidth portion according to the second configuration, and the UE receives downlink data accordingly.

Referring back to FIGS. 3 and 4, in one exemplary embodiment of a UE, the device 300 includes a program code 312 stored in the memory 310. The CPU 308 could execute program code 312 to enable the UE (i) to receive a dedicated signaling which configures a first bandwidth portion and a second bandwidth portion within a cell from a base station, (ii) to receive a first configuration indicating a first precoding resource group (PRG) size for the first bandwidth portion, and (iii) to receives a second configuration indicating a second PRG size for the second bandwidth portion. Furthermore, the CPU 308 can execute the program code 312 to perform all of the above-described actions and steps or others described herein.

Figure 36:
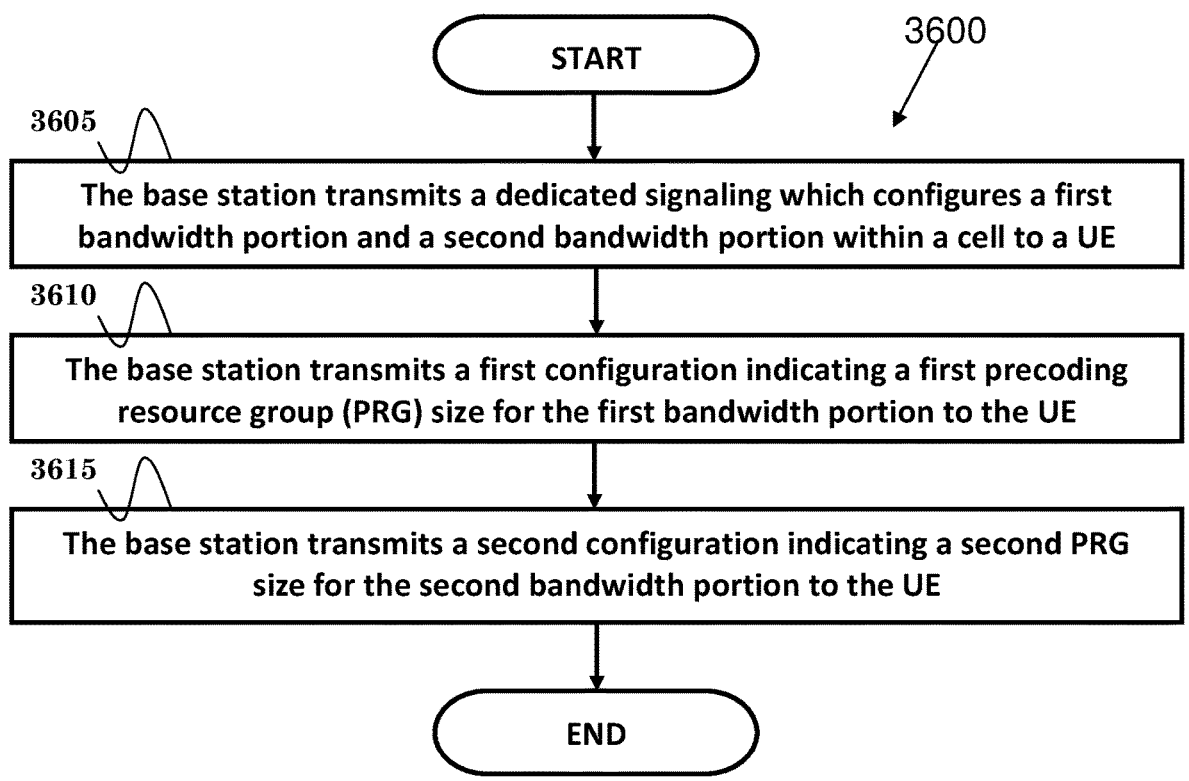
FIG. 36 is a flow chart according to one exemplary embodiment.

FIG. 36 is a flow chart 3600 according to one exemplary embodiment. In step 3605, the base station transmits a dedicated signaling which configures a first bandwidth portion and a second bandwidth portion within a cell to a UE. In step 3610, the base station transmits a first configuration indicating a first precoding resource group size for the first bandwidth portion to the UE. In step 3615, the base station transmits a second configuration indicating a second PRG size for the second bandwidth portion to the UE.

In one embodiment, the base station determines PRGs within the first bandwidth portion according to the first configuration, the base station determines PRGs within the second bandwidth portion according to the second configuration, and the base station transmits downlink data to the UE accordingly.

Referring back to FIGS. 3 and 4, in one exemplary embodiment of a base station, the device 300 includes a program code 312 stored in the memory 310. The CPU 308 could execute program code 312 to enable the base station (i) to transmit a dedicated signaling which configures a first bandwidth portion and a second bandwidth portion within a cell to a UE, (ii) to transmit a first configuration indicating a first precoding resource group size for the first bandwidth portion to the UE, and (iii) to transmit a second configuration indicating a second PRG size for the second bandwidth portion to the UE. Furthermore, the CPU 308 can execute the program code 312 to perform all of the above-described actions and steps or others described herein.

In the context of the embodiments illustrated in FIGS. 35 and 36, and described above, in one embodiment, the first bandwidth portion could be partitioned by the first PRG size, and the second bandwidth portion is partitioned by the second PRG size. Furthermore, sizes of PRGs could follow non-increasing order in frequency domain within the first bandwidth portion, and sizes of PRGs could follow non-increasing order in frequency domain within the second bandwidth portion.

In one embodiment, the first bandwidth portion could comprise a first number of physical resource blocks (PRBs), and the second bandwidth portion could comprise a second number of PRBs.

In one embodiment, a plurality of PRGs within the first bandwidth portion could have the first PRG size, and a plurality of PRGs within the second bandwidth portion could have the second PRG size.

Figure 37:
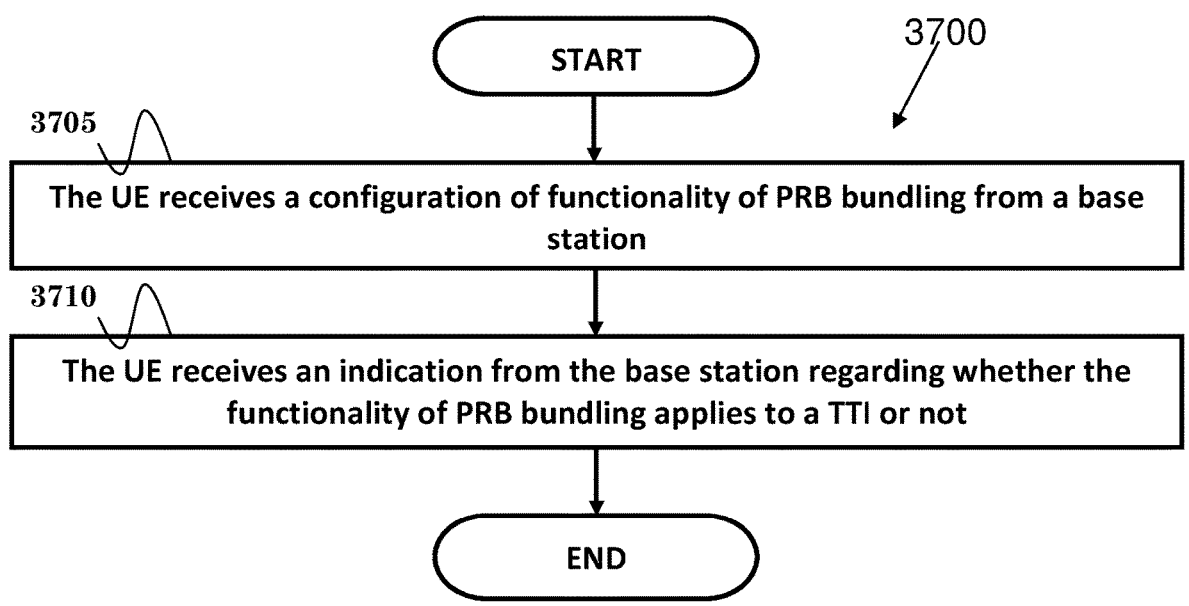
FIG. 37 is a flow chart according to one exemplary embodiment.

FIG. 37 is a flow chart 3700 according to one exemplary embodiment. In step 3705, the UE receives a configuration of functionality of PRB bundling from a base station. In step 3710, the UE receives an indication from the base station regarding whether the functionality of PRB bundling applies to a TTI or not.

In one embodiment, the UE receives downlink data in the TTI according to the indication.

Referring back to FIGS. 3 and 4, in one exemplary embodiment of a UE, the device 300 includes a program code 312 stored in the memory 310. The CPU 308 could execute program code 312 to enable the UE (i) to receive a configuration of functionality of PRB bundling from a base station, and (ii) to receive an indication from the base station regarding whether the functionality of PRB bundling applies to a TTI or not. Furthermore, the CPU 308 can execute the program code 312 to perform all of the above-described actions and steps or others described herein.

Figure 38:
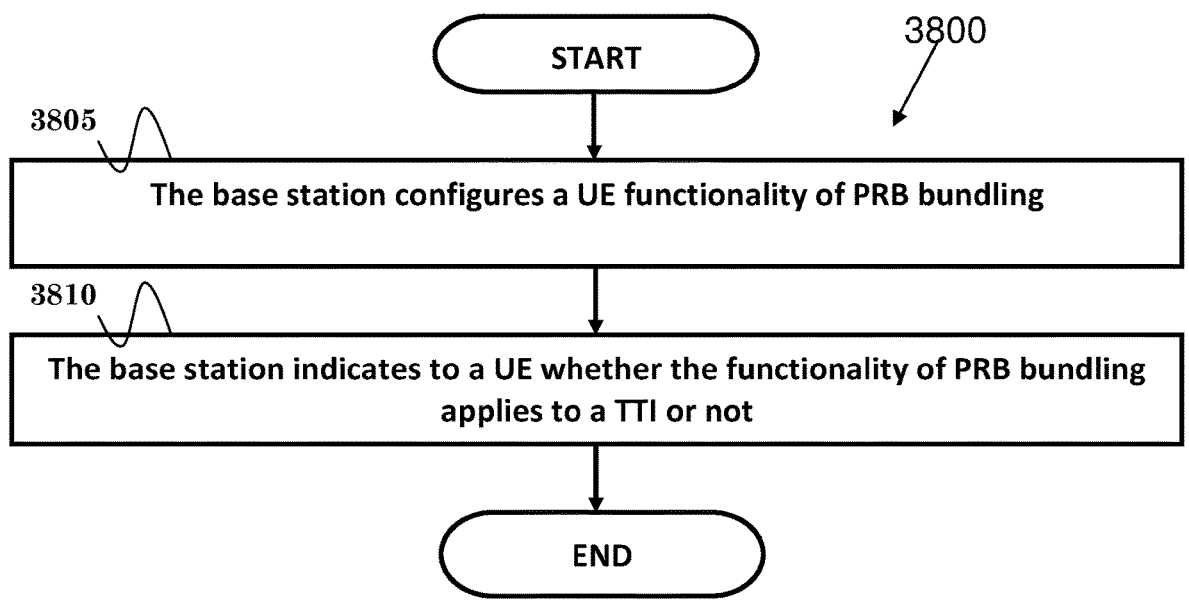
FIG. 38 is a flow chart according to one exemplary embodiment.

FIG. 38 is a flow chart 3800 according to one exemplary embodiment. In step 3805, the base station configures a UE functionality of PRB bundling. In step 3810, the base station indicates to a UE whether the functionality of PRB bundling applies to a TTI or not.

In one embodiment, the base station transmits downlink data in the TTI according to the indication.

Referring back to FIGS. 3 and 4, in one exemplary embodiment of a base station, the device 300 includes a program code 312 stored in the memory 310. The CPU 308 could execute program code 312 to enable the base station (i) to configure a UE functionality of PRB bundling from a base station, and (ii) to indicate to a UE whether the functionality of PRB bundling applies to a TTI or not. Furthermore, the CPU 308 can execute the program code 312 to perform all of the above-described actions and steps or others described herein.

In the context of the embodiments illustrated in FIGS. 37 and 38 and described above, in one embodiment, the transmission time interval could be a subframe, a slot, or a mini-slot.

In one embodiment, indication of whether the functionality of PRB bundling applies to a transmission time interval (TTI) or not is carried on a control channel.

In one embodiment, the control channel could be used to schedule a data channel to the UE.

In one embodiment, the indication could be applicable to a transmission time interval the data channel associated with. The indication could also be applicable to a transmission time interval the control channel associated with.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
the UE receives a dedicated signaling which configures a first bandwidth portion of a system bandwidth of a cell and a second bandwidth portion of the system bandwidth of the cell from a base station, wherein the dedicated signaling indicates a first size and a first location of the first bandwidth portion within the system bandwidth of the cell and a second size and a second location of the second bandwidth portion within the system bandwidth of the cell;
the UE receives a first configuration indicating a first precoding resource group (PRG) size for the first bandwidth portion;
the UE receives a second configuration indicating a second PRG size for the second bandwidth portion, wherein the second PRG size is different from the first PRG size, and wherein each of the first bandwidth portion and the second bandwidth portion of the system bandwidth include a plurality of PRGs; and
the UE determines each of the plurality of PRGs within the first bandwidth portion according to the first PRG size, and the UE determines each of the plurality of PRGs within the second bandwidth portion according to the second PRG size.

2. The method of claim 1, wherein the UE receives downlink data accordingly.

3. The method of claim 1, wherein the first bandwidth portion is partitioned by the first PRG size, and the second bandwidth portion is partitioned by the second PRG size.

4. The method of claim 1, wherein sizes of PRGs follow non-increasing order in frequency domain within the first bandwidth portion, and sizes of PRGs follow non-increasing order in frequency domain within the second bandwidth portion.

5. The method of claim 1, wherein a plurality of PRGs with in the first bandwidth portion have the first PRG size, and a plurality of PRGs with in the second bandwidth portion have the second PRG size.

6. A method of a base station, comprising:
   the base station transmits a dedicated signaling which configures a first bandwidth portion of a system bandwidth and a second bandwidth portion of the system bandwidth within a cell to a UE (User Equipment), wherein the dedicated signaling indicates a first size and a first location of the first bandwidth portion of the system bandwidth and a second size and a second location of the second bandwidth portion of the system bandwidth;
   the base station transmits a first configuration indicating a first precoding resource group (PRG) size for the first bandwidth portion to the UE;
   the base station transmits a second configuration indicating a second PRG size for the second bandwidth portion to the UE, wherein the second PRG size is different from the first PRG size, and wherein each of the first bandwidth portion and the second bandwidth portion include a plurality of PRGs; and
   the base station determines each of the plurality of PRGs within the first bandwidth portion of the system bandwidth according to the first PRG size, and the base station determines PRGs within the second bandwidth portion of the system bandwidth according to the second PRG size.

7. The method of claim 6, wherein the base station transmits downlink data to the UE accordingly.

8. The method of claim 6, wherein the first bandwidth portion is partitioned by the first PRG size, and the second bandwidth portion is partitioned by the second PRG size.

9. The method of claim 6, wherein sizes of PRGs follow non-increasing order in frequency domain within the first bandwidth portion, and sizes of PRGs follow non-increasing order in frequency domain within the second bandwidth portion.

10. The method of claim 6, wherein a plurality of PRGs within the first bandwidth portion have the first PRG size, and a plurality of PRGs within the second bandwidth portion have the second PRG size.

* * * * *